United States Patent [19]

Balsells

[11] Patent Number: 5,709,371

[45] Date of Patent: Jan. 20, 1998

[54] COIL SPRING WITH ENDS ADAPTED FOR COUPLING WITHOUT WELDING

[75] Inventor: Peter J. Balsells, Santa Ana, Calif.

[73] Assignee: Bal Seal Engineering Company, Inc., Santa Ana, Calif.

[21] Appl. No.: 710,196

[22] Filed: Sep. 13, 1996

Related U.S. Application Data

[62] Division of Ser. No. 456,662, Jun. 2, 1995, Pat. No. 5,615, 870.

[51] Int. Cl.⁶ .................................................. F16F 1/06
[52] U.S. Cl. ................................. 267/167; 267/179
[58] Field of Search .............................. 267/167, 174, 267/179, 180, 169

[56] References Cited

U.S. PATENT DOCUMENTS

| | | | |
|---|---|---|---|
| 106,328 | 8/1870 | Moore | 267/167 X |
| 1,846,257 | 2/1932 | Huck | 267/167 X |
| 2,898,102 | 8/1959 | Armstrong | 267/167 |
| 2,991,064 | 7/1961 | De Jean | 267/167 |

*Primary Examiner*—Lee W. Young
*Attorney, Agent, or Firm*—Walter A. Hackler

[57] ABSTRACT

Spring apparatus is provided which includes coil springs having intermediate and end coils suitable for interconnection in order to form a continuous spring which maintains a constant load-deflection characteristic over all intermediate coils unaffected by the joint end coils. This configuration therefore finds particular utility in providing bias without compromise of sealing, electromagnetic shielding and/or conductivity.

7 Claims, 23 Drawing Sheets

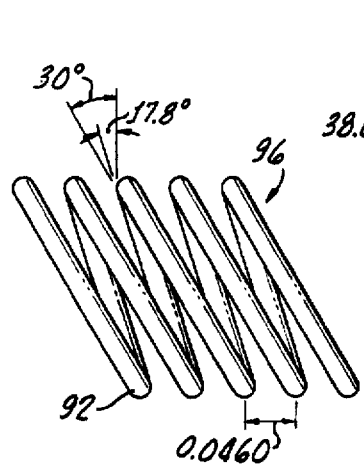
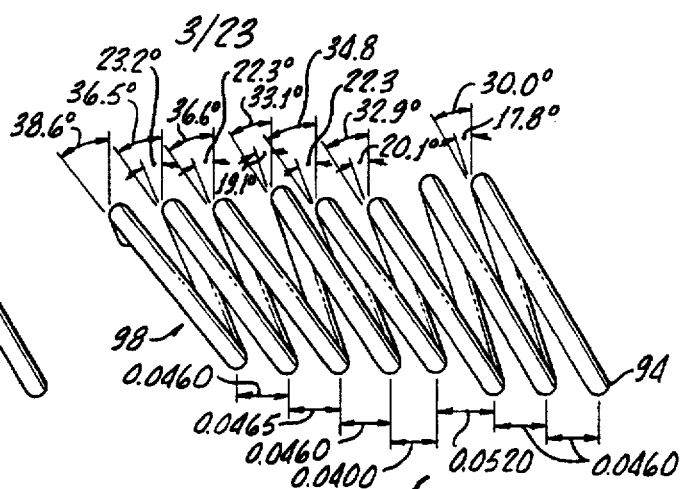
_FIG. 12._  _FIG. 13._
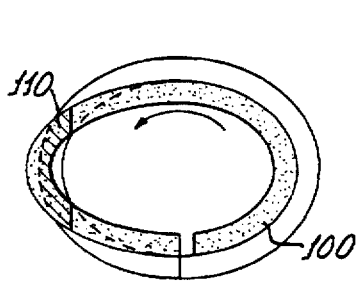 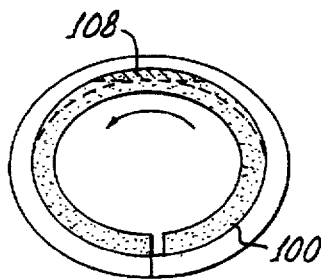 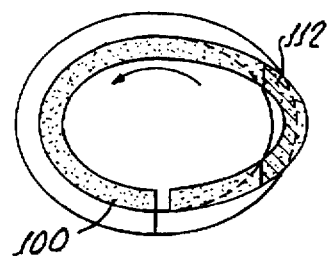
_FIG. 14._  _FIG. 15._  _FIG. 16._
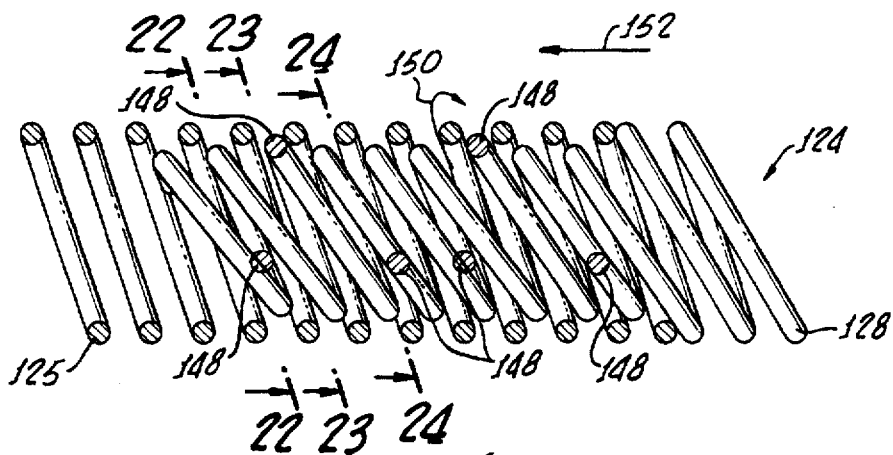
_FIG. 17._

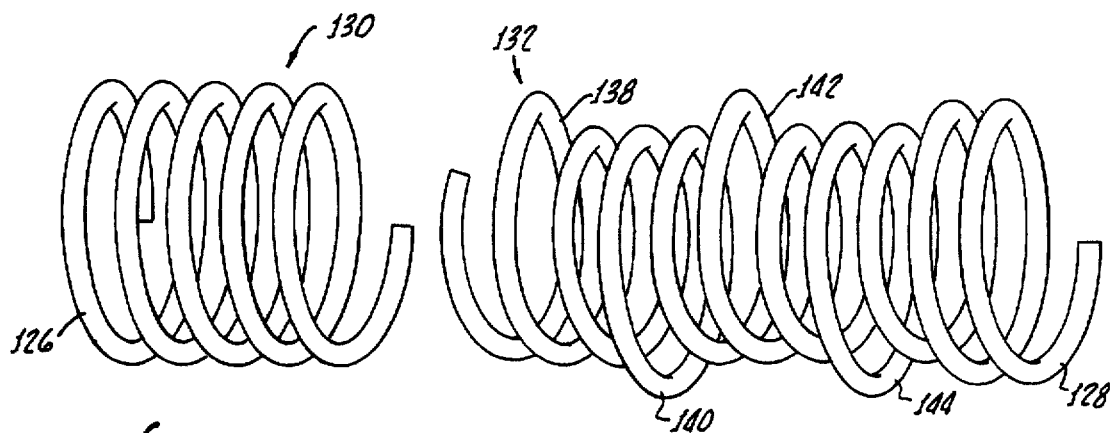
_FIG. 18._  _FIG. 19._
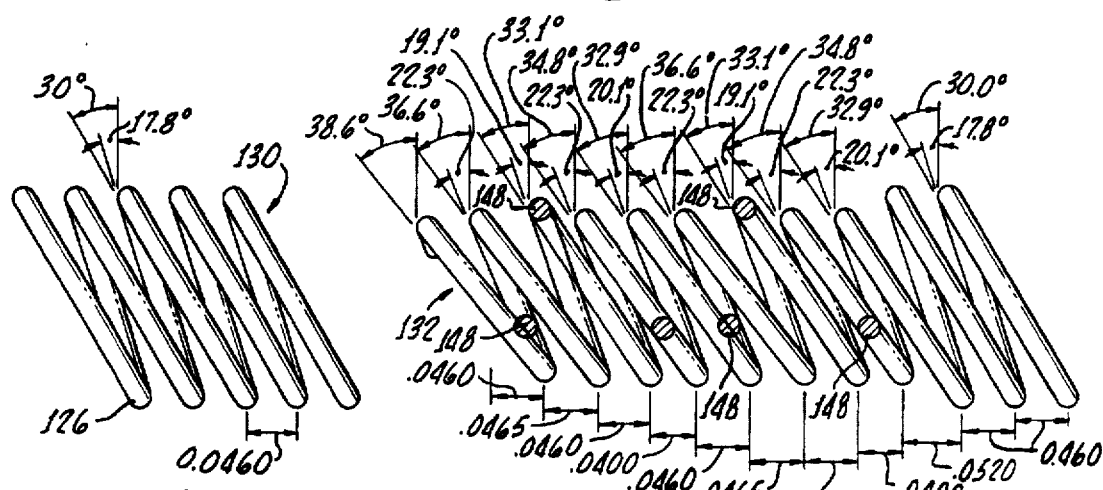
_FIG. 20._  _FIG. 21._
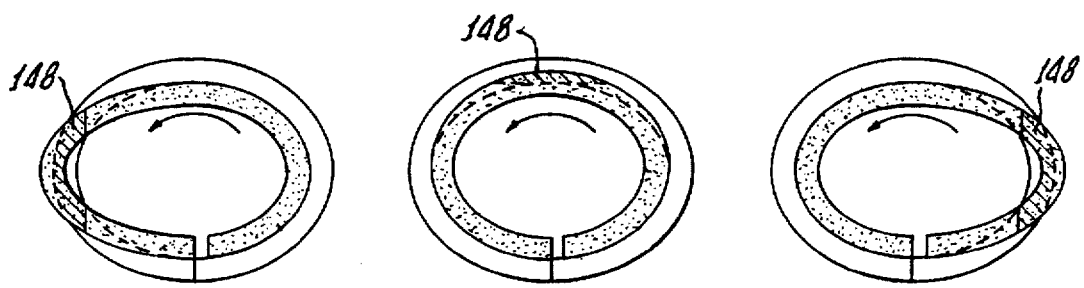
_FIG. 22._  _FIG. 23._  _FIG. 24._

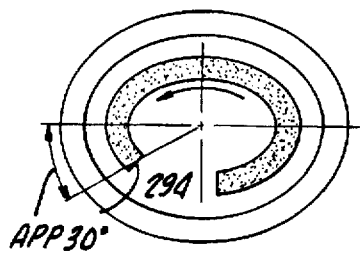
_Fig. 48._
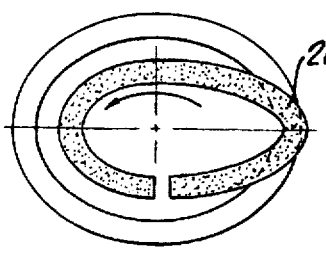
_Fig. 49._
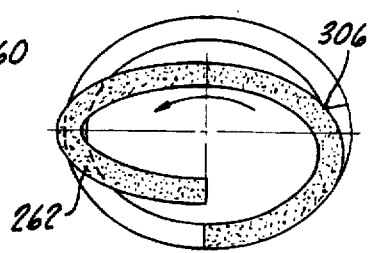
_Fig. 50._
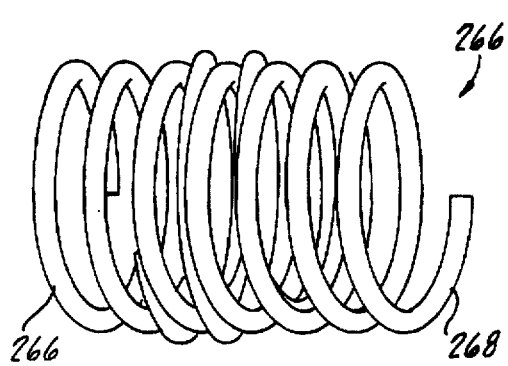
_Fig. 51._
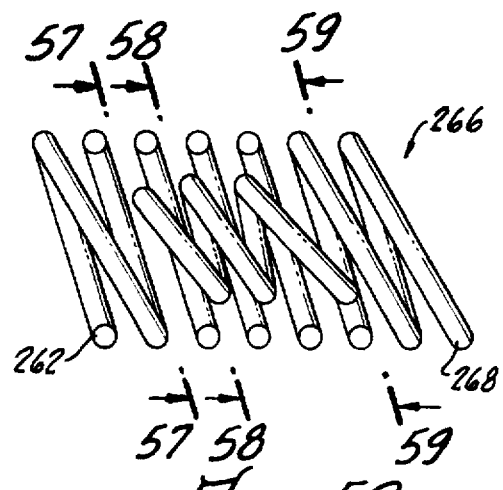
_Fig. 52._
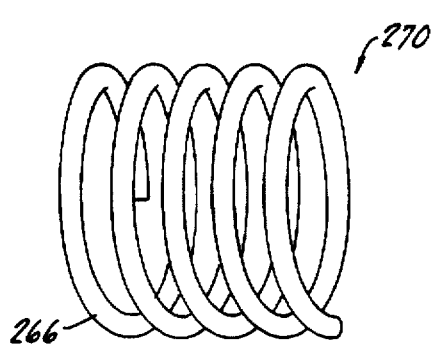
_Fig. 53._
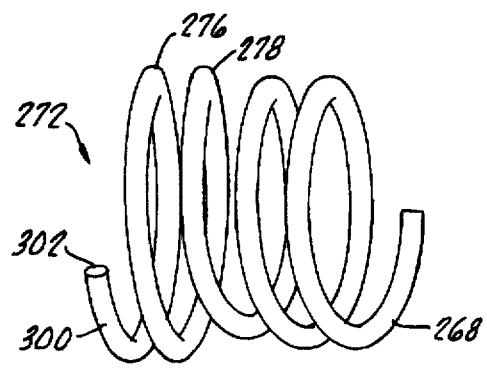
_Fig. 54._

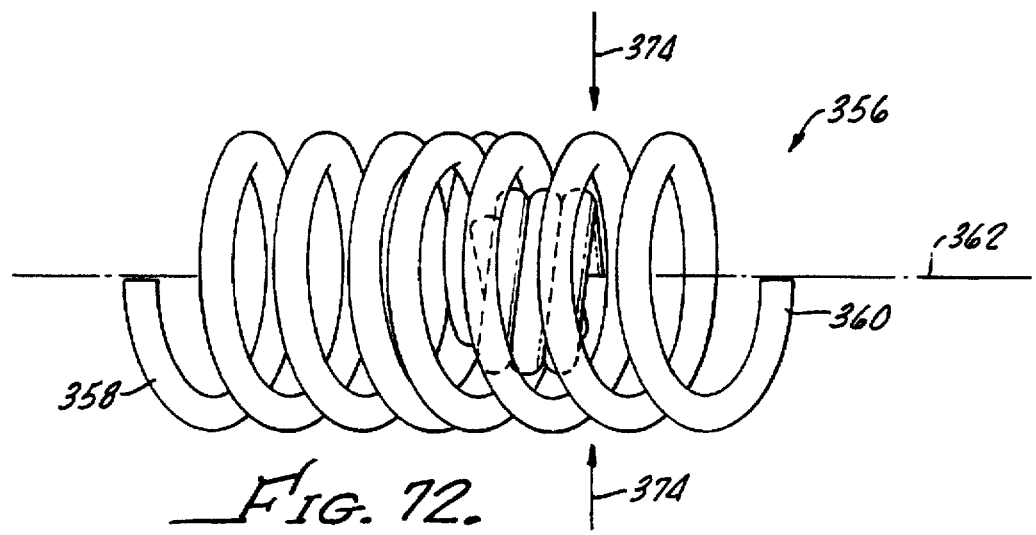
FIG. 72.
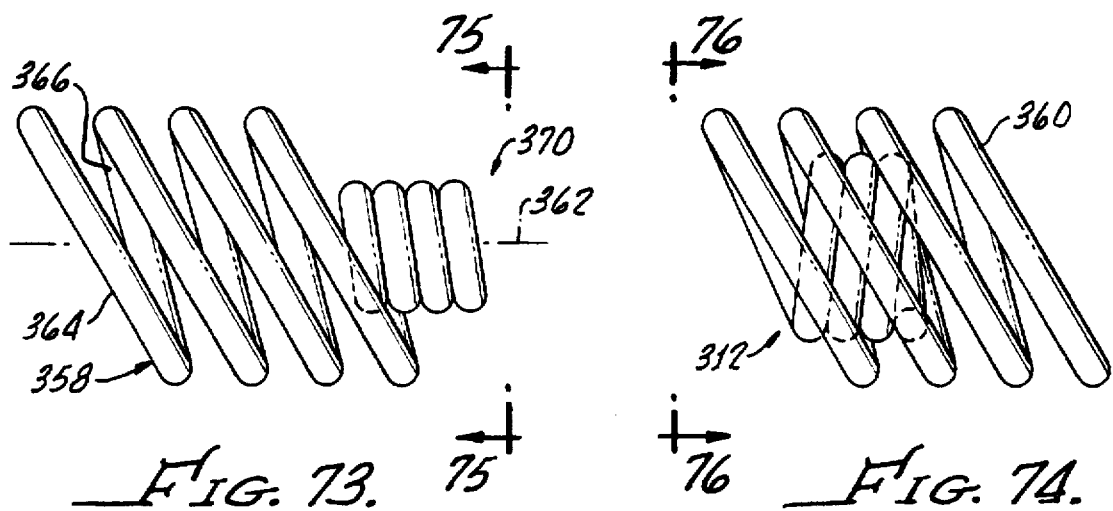
FIG. 73.　　FIG. 74.
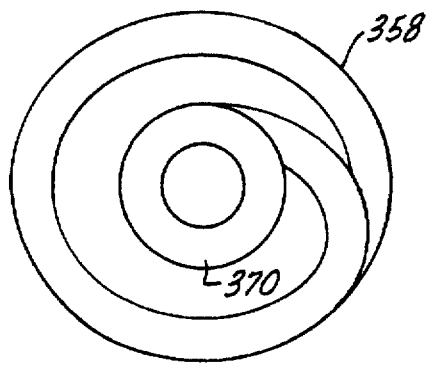　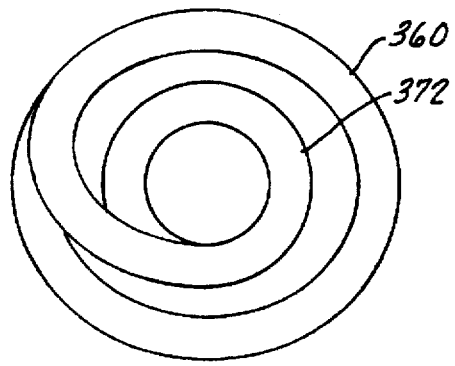
FIG. 75.　　FIG. 76.

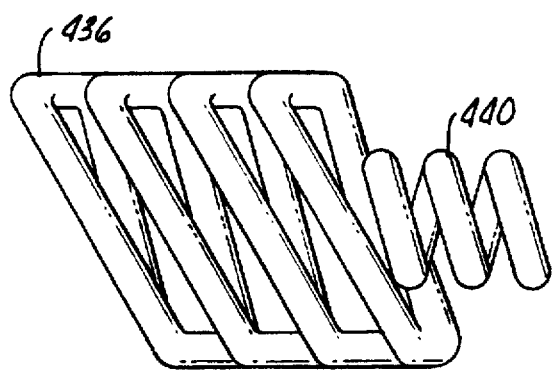
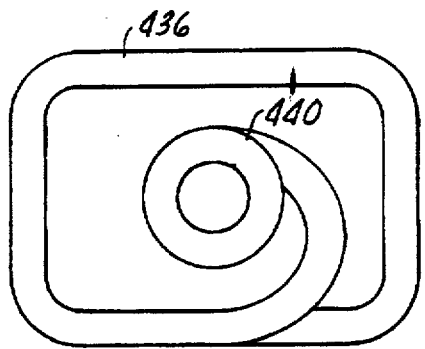
_FIG. 89A._  _FIG. 89B._
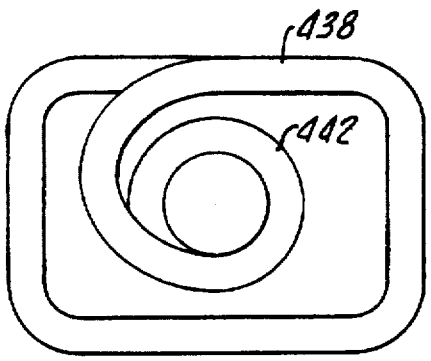
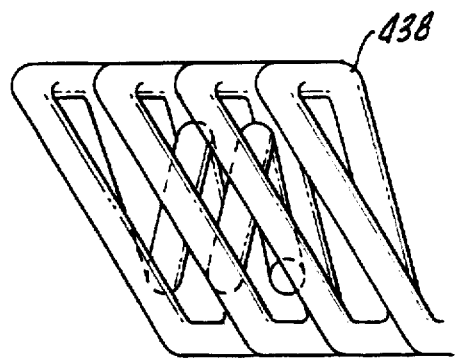
_FIG. 90A._  _FIG. 90B._
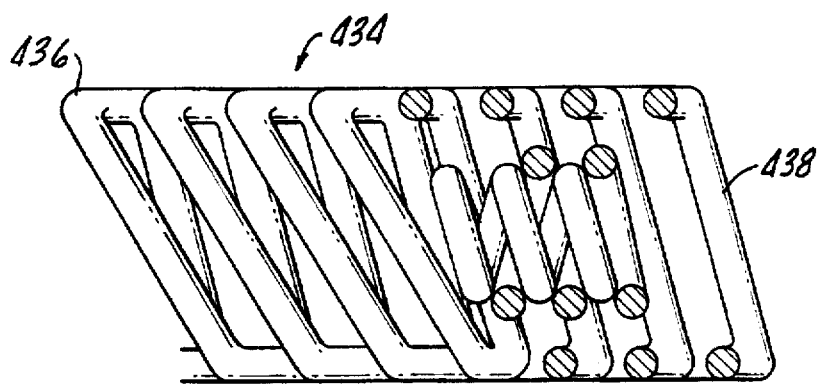
_FIG. 91._

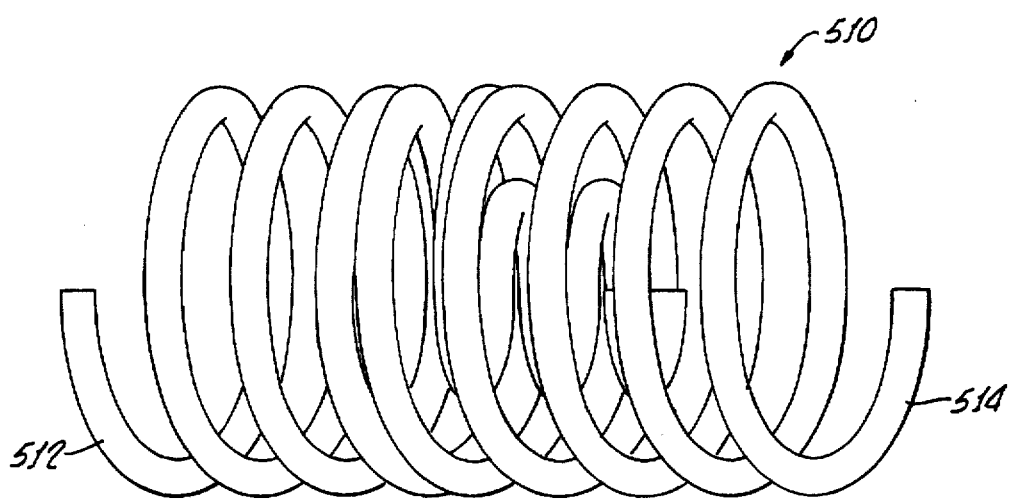
_Fig. 109._
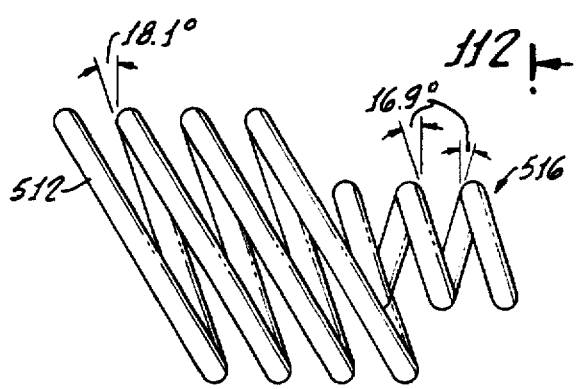
_Fig. 110._
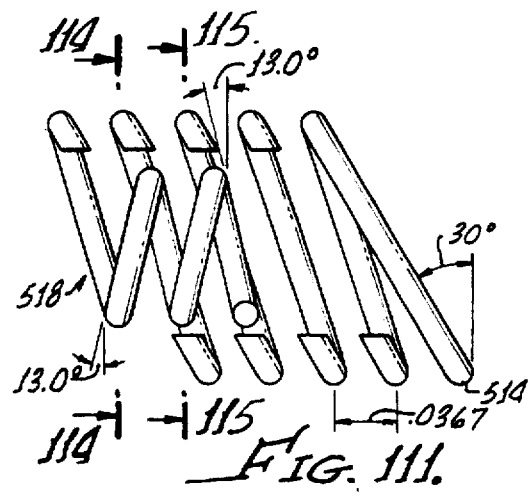
_Fig. 111._
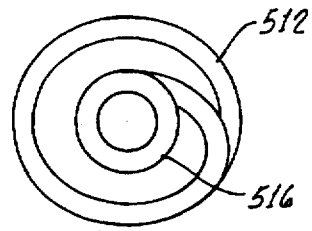
_Fig. 112._
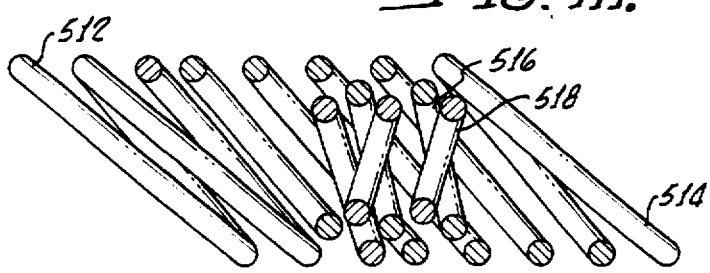
_Fig. 113._
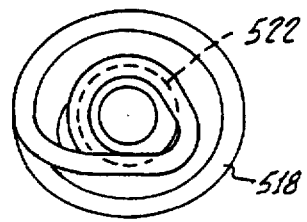
_Fig. 114._
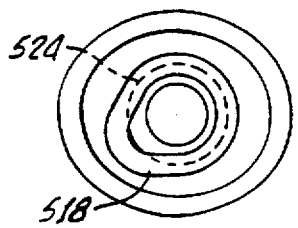
_Fig. 115._

COIL SPRING WITH ENDS ADAPTED FOR COUPLING WITHOUT WELDING

This application is a division of application Ser. No. 08/456,662, filed Jun. 2, 1995 now U.S. Pat. No. 5,615,870.

The present invention generally relates to springs and spring devices for providing bias, sealing, electromagnetic shielding and conductivity, and is more particularly directed to joining of coil springs while at the same time maintaining spring characteristics during deflection, i.e., either radial or axial, compression, of the coils, and extension caused by loading of the spring along a central axis throughout.

When spring ends are joined to form a closed spring, such as, for example, an annulus, a further distinguishing feature of such annular springs is their suitability for either radial loading, i.e., along a radius of the annular spring, or axial loading, i.e., along an axis of the spring annulus.

The joining of the spring ends is a problem that has been addressed throughout the years but with generally unsatisfactory results. This is primarily due to the fact that the joined ends of the spring do not have the same load deflection characteristics as intermediate portions of the spring, thus resulting in a nonuniform biasing, or loading, of parts which can result in inefficient sealing blockage of electromagnetic waves and nonuniform conductivity.

As specifically pointed out in U.S. Pat. No. 3,190,633, springs are usually formed of tempered steel and therefore many times cannot be joined at the extreme end by soldering since such joint would be too weak. Nor can they be joined by brazing or welding, since the heat necessary for such joining often destroys the temper of the steel.

In an attempt to overcome the problems inherent with welding or soldering, U.S. Pat. No. 3,190,633 utilizes a coupling in the form of a tube for the joining of the spring ends. Unfortunately, this introduces a nonlinearity in the spring size; and further, due to the bulkiness of the coupling, uniform load characteristics cannot be obtained throughout the spring structure which results in the limitations as hereinabove discussed.

Further elaboration on the disadvantages of joining the ends of a spring by adhesive or a solder includes the time-consuming operation for effecting the union, and the spring is made less efficient, particularly if a number of the spring coils are loaded with solder. This latter configuration also increases in a nonuniform manner the weight of the spring and contributes significantly to a nonlinearity of the spring characteristics in the region of the joined ends.

Other known methods of constructing annular devices have been taught in the art over a great number of years. For example, one known method is to provide on one end of the coiled spring, coils of smaller diameter, while another end includes a diameter consistent with intermediate coils of the spring. Coupling is accomplished by forcing the reduced diameter end into the other end, such as set forth in U.S. Pat. Nos. 266,529; 3,011,775; and 3,186,701. However, in all of these springs, the outer coils are supported by inner coils which, in the area of the joint, disrupt the load-deflection characteristics of the outer coils.

A further teaching of this type of spring may be found in U.S. Pat. No. 3,276,761, in which the end having reduced diameter also has protruding spring forms for engaging spring convolutions of another end of a spring. Again, the overall configuration of the joint to not enable freedom of movement of the outer coils during compression.

Alternative teachings of spring joining provide for a spring coil of constant diameter with the ends connected by forcing them on to a connecting member, or plug, which is received and positioned within two ends. In this regard, U.S. Pat. No. 735,731 utilizes a screw, or headless plug, with screw threads of substantially the same pitch as the coils of the spring. While this results in an endless helical spring, uniformity of resilience along the helical spring cannot be expected due to the size of the screw utilized for connecting ends of the spring.

U.S. Pat. No. 1,867,723 discloses a coupling member in the form of a cap. U.S. Pat. No. 2,001,835 utilizes a connector formed with a plurality of convolutions of relatively larger diameter for engagement with a constant diameter coil spring.

Other teachings of the connector member include U.S. Pat. No. 2,778,697, which shows a connector strip provided with a set of semicircular recesses for accepting coils of both ends of a coiled spring. A variation of this design is shown in U.S. Pat. No. 3,157,056, in which the strip taught in U.S. Pat. No. 2,778,697 is replaced by a cylindrical member having recesses for accepting coil springs.

All of this, of course, obviously interfere with the operation of the spring in the area of the coupling member and therefore do not achieve consistent spring characteristics which are necessary for both efficient biasing and sealing.

Other connecting members are shown in U.S. Pat. No. 2,721,091, showing a rubber embedded helix; U.S. Pat. No. 2,779,647, which shows a keeper link arrangement; and U.S. Pat. Nos. 3,359,617 and 4,718,868 which show a spring-connecting member.

As set forth in U.S. Pat. No. 2,991,061, other known methods for joining helical coils include a hook or loop formed on each end of the coil which are connected to form the coil into an annulus and methods which include springs having one or more convolutions at each end which are spaced apart from one another, so they may be connected by being intertwined together to connect the two ends to form an annular spring device.

However, all of these methods have serious disadvantages, as pointed out in U.S. Pat. No. 2,991,064, and in none of them is produced an annular spring having ends which are so firmly connected that the spring will withstand severe vibration and shock without malformation or separation of the ends or excessive extension or unwinding.

Further, the springs have uniform load deflection characteristics due to the interrupted nature of the spring coupling device utilized.

The present invention overcomes the difficulties of the prior art and provides an array of coil-joining techniques which are suitable for either axial-type springs, radial-type springs in which the spring utilized can have canted external coils that can be round, elliptical, square or rectangular, or a combination.

SUMMARY OF THE INVENTION

Spring apparatus, in accordance with the present invention, generally includes a coil spring having two ends and a plurality of intermediate coils canted along the centerline of the coil spring with each coil having a leading portion disposed at a front angle to a normal line to the centerline and a trailing portion disposed at a back angle to the normal line. The intermediate coils may be round, elliptical, square, rectangular or a combination of two or more of the recited shapes.

Importantly, end coils congruent with the plurality of intermediate coils are disposed at the two ends and include back angle means, defining a trailing portion of at least one end coil, for locking the end coils together. In this instance, the end coil trailing portion of the end coil has a back angle different from the intermediate coil trailing portion back angle. When joined, the resulting continuous coil may be configured for axial or radial loading.

More particularly, the apparatus in accordance with the present invention may include an end coil trailing portion having a decreasing back angle along the length of the end coil. In addition, one of the end coils may be tapered, or both of the end coils may be tapered.

In one embodiment of the present invention, the end coils are tapered asymmetric to the centerline of the coil spring. In addition, where the intermediate coils are elliptical, they may be tapered along a major and/or along a minor axis of the coils. In one embodiment of the present invention, the end coils are both tapered asymmetric to the centerline of the coil spring, and in the embodiment where the coil springs are elliptical, the end coils may be elliptical with at least one of the coils being offset along a major axis thereof.

The spring ends may be held together by a snap action, that can consist of threading, straight push, or a combination twist and push can cause the ends to be locked together or have interference between coils to cause the coils to engage each other by having the end coils round or elliptical. In this instance, the means for causing the end coils to snap together is an elliptical shape thereof, which causes a portion of the elliptical shaped end coil to extend exterior to a circumference of another end coil.

In this last embodiment, the intermediate coils and the end coils may be elliptical. Further, the end coils have a coil height, measured along a minor axis thereof, which is substantially smaller than an intermediate coil height, measured along a minor axis thereof.

The hereinabove recited embodiments, as well as the hereinafter recited embodiments of the present invention, enable the coupling of the ends of a spring to form a continuous spring in which the coupling of the end coils do not inhibit or substantially affect the load-deflection characteristics of the continuous spring in the area of the joint end coils. This occurs because the joining configuration, namely, the coupling end portions, do not interfere with the compression or expansion of the intermediate coils of the spring because of their size, position or both with regard to the intermediate coils.

In another embodiment of the present invention, the end coils may have a reduced diameter, i.e., "stepped-down" from the size of the intermediate coils.

In various embodiments of the present invention, the end coils may have an exterior male, round, elliptical, or offset, and an interior female, round, elliptical, or offset, or alternatively the end stepped-down coils may have both an exterior male configuration and an exterior female configuration. In these embodiments, as hereinafter described in greater detail, the end coils may be threaded, snapped on, pushed on, or pushed on in a manner to provide locking action.

Further, a coil in the nature of a hook may be provided for further securing a locking of the end coils together with the hook coil being interior to the intermediate coils.

In addition, all of the embodiments of the present invention may be further combined with an elastomer having either a solid center or a hollow center in order to provide sealing, shielding, added force, or enhancing the conductivity by enabling portions of the coil to be bare to enable enhanced conductivity.

BRIEF DESCRIPTION OF THE DRAWINGS

The advantages and features of the present invention will be better understood by the following description when considered in conjunction with the accompanying drawings in which:

FIG. 12 is a side view of the end coil shown in FIG. 10;

FIG. 13 is a side view of the end coil shown in FIG. 11;

FIG. 14 is a view of the assembly shown in FIG. 9, taken along the line 14—14;

FIG. 15 is a view of the assembly shown in FIG. 9, taken along the line 15—15;

FIG. 16 is a view of the assembly shown in FIG. 9, taken along the line 16—16;

FIG. 17 is a cutaway side view of a spring assembly in accordance with yet another embodiment of the present invention;

FIG. 18 is a top view of an end coil of the assembly shown in FIG. 17;

FIG. 19 is a top view of another end coil of the assembly shown in FIG. 17, showing protruding elliptical coils which provide for back angle locking;

FIG. 20 is a side view of the end coil shown in FIG. 18;

FIG. 21 is a side view of the end coil shown in FIG. 19;

FIG. 22 is a view of the assembly shown in FIG. 17, taken along the line 22—22;

FIG. 23 is a view of the assembly shown in FIG. 13, taken along the line 23—23;

FIG. 24 is a view of the assembly shown in FIG. 17, taken along the line 24—24;

FIG. 48 is a view of the assembly shown in FIG. 43 taken along the line 48—48;

FIG. 49 is a view of the assembly shown in FIG. 43, taken along the line 49—49;

FIG. 50 is a view of the assembly shown in FIG. 43, taken along the line 50—50;

FIG. 51 is a top view of another spring assembly, in accordance with still another embodiment of the present invention;

FIG. 52 is a cutaway side view of the assembly shown in FIG. 51;

FIG. 53 is a top view of one end coil of the assembly shown in FIG. 52;

FIG. 54 is a top view of another coil of the assembly shown in FIG. 52;

FIG. 72 is a top view of another embodiment of the present invention utilizing male and female end coils;

FIG. 73 is a side view of an end coil of the spring assembly shown in FIG. 72 in which the end coils are abutting;

FIG. 74 is a side view of another end coil of the spring assembly shown in FIG. 72 in which the female end coils is disposed within the intermediate coils;

FIG. 75 is a view of the end coil shown in FIG. 73, taken along the line 75—75;

FIG. 76 is a view of the end coil shown in FIG. 74, taken along the line 76—76;

FIGS. 89a and 89b are side views of a spring assembly similar to FIG. 77 in which the intermediate coils are rectangular and the one end coil is male, having exterior spaced apart coils;

FIGS. 90a and 90b show a female end coil disposed within intermediate coils for coupling with the end coils shown in FIGS. 89a and 89b;

FIG. 91 is a side view of a spring assembly formed by coupling of the end coils shown in FIGS. 89a and 90b;

FIG. 109 is a top view of yet another embodiment of the present invention similar to the assembly shown in FIG. 103;

FIG. 110 is a side view of an end coil of the spring assembly shown in FIG. 109;

FIG. 111 is a side view of another end coil of the spring assembly shown in FIG. 109;

FIG. 112 is a view of the end coil shown in FIG. 110 taken along the line 112—112;

FIG. 113 is a cutaway side view of the spring assembly 109 at maximum deflection under a load (not shown);

FIG. 114 is a view of the end coil shown in FIG. 111 taken along the line 114—114;

FIG. 115 is a view of the end coil shown in FIG. 111 taken along the line 115—115;

FIG. 119 is a view of the end coil shown in FIG. 117 taken along the line 119—119;

FIG. 120 is a view of the end coil shown in FIG. 118 taken along the line 120—120;

FIG. 121 is a cutaway side view of the spring assembly shown in FIG. 116 at maximum deflection and illustrating the coupled end coils not being in interference with the deflection of the intermediate coils upon loading;

FIG. 122 is a side view of a spring assembly, in accordance with the present invention, further including an elastomer surrounding the intermediate and end coils;

FIG. 123 is a view of the spring assembly shown in FIG. 122 taken along the line A—A in one embodiment in which the elastomer has a solid center;

FIG. 124 is a view of the spring assembly shown in FIG. 122 taken along the line A—A in which the elastomer has a hollow center;

FIG. 125 is a view of the spring assembly shown in FIG. 122 taken along the line B—B in which the elastomer has a solid center;

FIG. 126 is a view of the spring assembly shown in FIG. 122 taken along the line B—B in which the elastomer has a hollow center;

FIG. 127 is a view of the spring assembly shown in FIG. 122 taken along the line C—C in which the elastomer has a solid center;

FIG. 128 is a view of the spring assembly shown in FIG. 122 taken along the line C—C in which the elastomer has a hollow center;

FIG. 129 is a view of the spring assembly shown in FIG. 122 taken along the line D—D in which the elastomer has a solid center;

FIG. 130 is a view of the spring assembly shown in FIG. 122 taken along the line D—D in which the elastomer has a hollow center;

Figure 131:
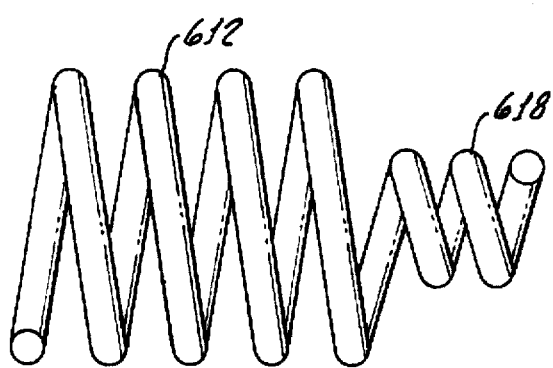
Figure 132:
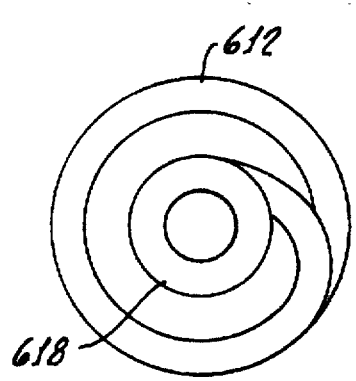
Figure 133:
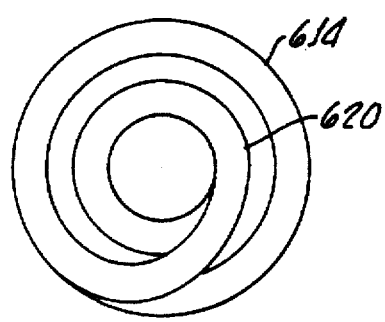
Figure 134:
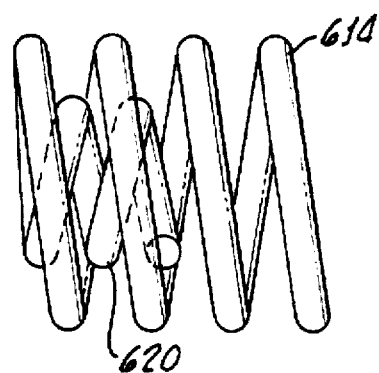

FIG. 131 is a side view of uncanted, circular intermediate and end coils;

FIG. 132 is an end view of the coils shown in FIG. 131;

FIG. 133 is a side view of mating uncanted, circular intermediate and end coils;

FIG. 134 is an end view of the coil shown in FIG. 133; and

Figure 135:
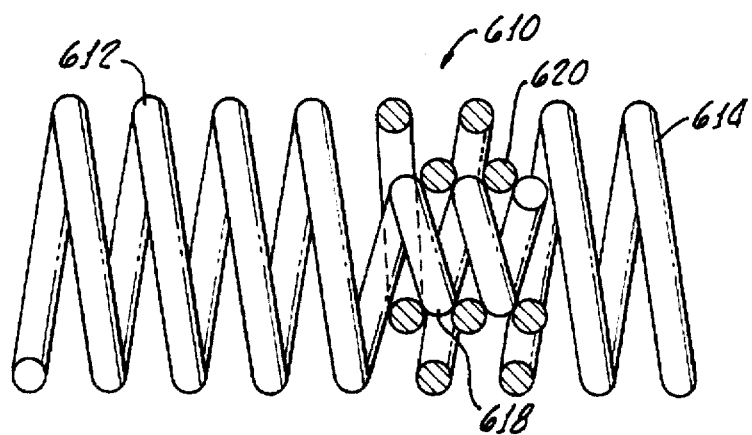

FIG. 135 is a side view of an assembled, uncanted circular coil coil spring.

DETAILED DESCRIPTION

It should be appreciated that the drawings include specific spring angles and in many cases, dimensions and the specific references are set forth by way of example only and are not be construed as limiting in any way the breadth of the present invention. The specific dimensions are provided for reference and not repeated in the specification for the sake of clarity.

Figure 1:
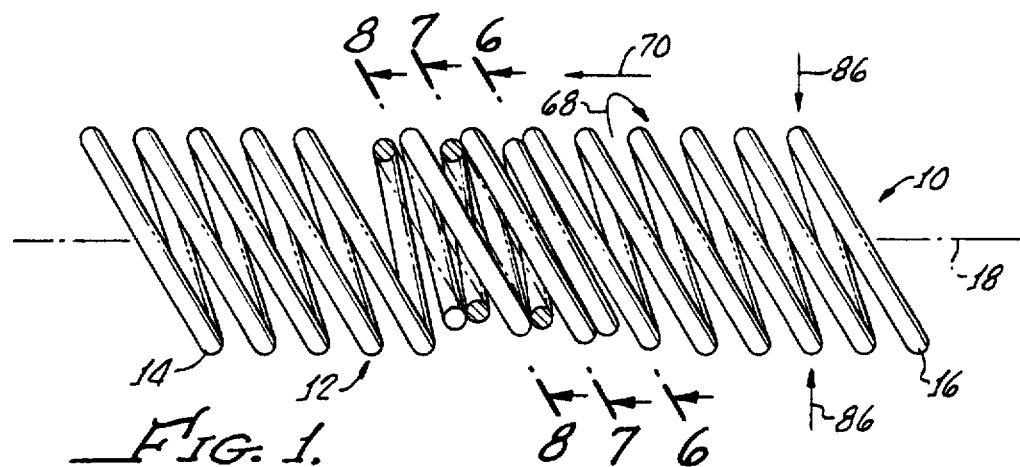
FIG. 1 is a cutaway side view of one embodiment of the present invention, generally showing coupling of two end coils to form a continuous coil spring.
Figure 2:
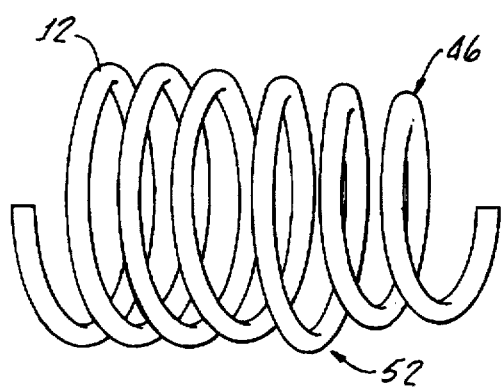
FIG. 2 is a top view of an end coil corresponding to FIG. 1, prior to assembly.
Figure 3:
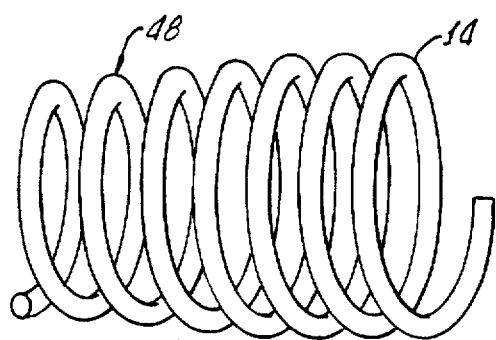
FIG. 3 is a top view of another end coil according to FIG. 1, prior to assembly.

Turning now to FIGS. 1-3, there is shown spring apparatus 10 which includes a coil spring 12 having a plurality of intermediate coils 14, 16 canted along a centerline 18 of coil spring 12.

Figures 4, 5:
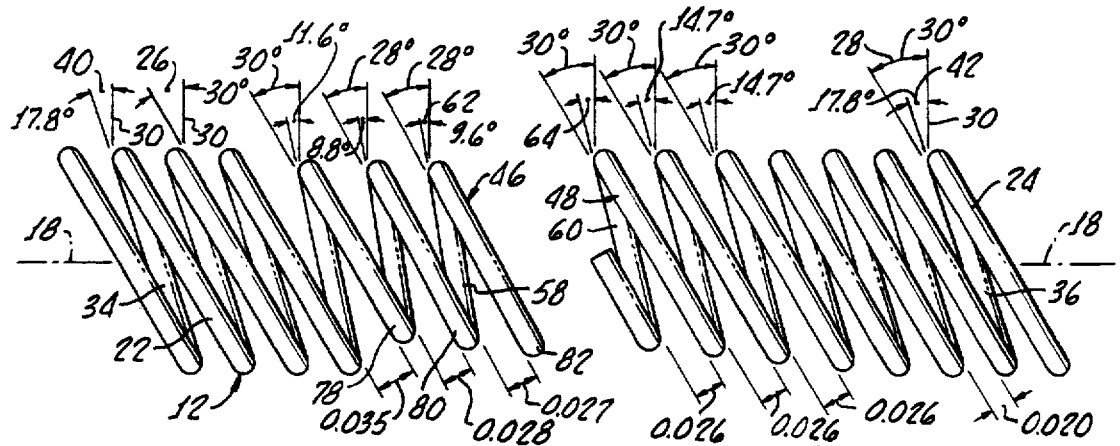
FIG. 4 is a side view of the end coil shown in FIG. 2.
FIG. 5 is a side view of the end coil shown in FIG. 3.

As more clearly shown in FIGS. 4 and 5, each coil 12, 14 includes a leading portion 22, 24 disposed at a front angle 26, 28 along a normal line 30 to the centerline 18. As shown in FIGS. 4 and 5, these intermediate coils have a front angle, for example purposes only, of 30°. Each of the intermediate coils 12, 14 has a trailing portion 34, 36 disposed at a back angle 40, 42 to the normal line 30.

As most clearly shown in FIGS. 2–5, end coils 46, 48 of the spring apparatus are congruent, or continuous, with the plurality of intermediate coils 12, 14 and are-disposed at ends 52, 54 of the intermediate coils 12, 14. As shown in FIGS. 4 and 5, each of the end coils, 46, 48 include trailing portions 58, 60 disposed at back angles 62, 64 which are different from the back angles 40, 42 of the intermediate coils.

Alternatively, the back angles 40, 42 may be the same and the front angles 26, 28, different from one another.

This difference in back angles enables the end coils 46, 48 to be threaded to one another in a clockwise manner illustrated by the arrow 68 in FIG. 1 when the end coil 48 is assembled into the end coil 46 in the direction of the arrow 70, as shown in FIG. 1.

More particularly, as shown in FIGS. 4 and 5, the end coil trailing portions 58, 60 have a decreasing back angle along a length of the end coil measured along a centerline 18.

As also illustrated in FIGS. 1–5, one or more of the end coils 46, 48 may be tapered, and as is most easily seen in FIGS. 4 and 5, the end coils may be tapered asymmetrically to the centerline 18. Thus, the end coils 46, 48 may be threaded, and the tapered ends, along with the difference back angle, provide a friction interference.

Figure 6:
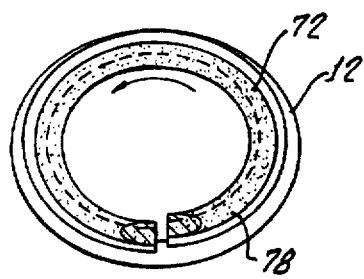
FIG. 6 is a view of the coil spring shown in FIG. 1, taken along the line 6—6.
Figure 7:
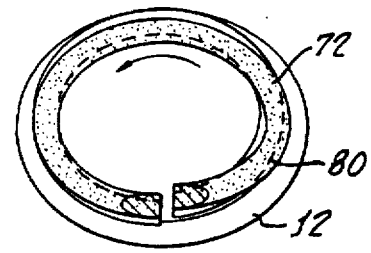
FIG. 7 is a view of the coil-spring shown in FIG. 1, taken along the line 7—7.
Figure 8:
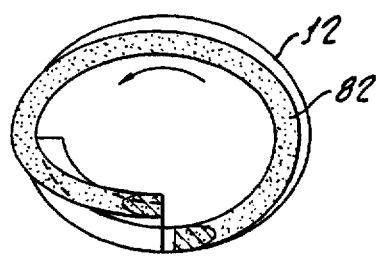
FIG. 8 is a view of the coil spring in FIG. 1, taken along the line 8—8.

As more clearly shown in FIGS. 6, 7 and 8, the intermediate and end coils may be elliptical in which there is a touching or interference between the end coils all around the periphery, as indicated by the shading 72. FIGS. 6, 7 and 8 show respectively a first coil 78 on the end coil 46, a second coil 80 on the end coil 46, and a third coil 82 on the end coil.

Because of the tapered nature of the end coils 46, 48, the height of the intermediate coils 14, 16 enable compression of the spring assembly 10 as indicated by the arrows 86 in FIG. 1 without interference from the end coils 46, 48, thus maintaining the load deflection characteristics of the intermediate coils 14, 16 across the union thereof provided by the end coils 46, 48.

Figure 9:
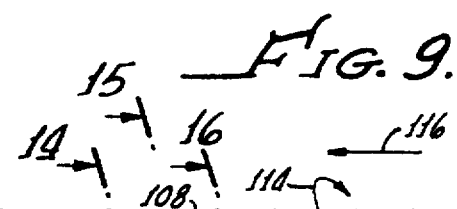
FIG. 9 is a cutaway side view of an assembled coil spring in accordance with another embodiment of the present invention.
Figure 10:
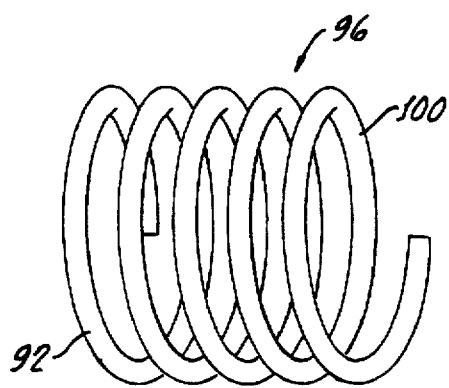
FIG. 10 is a top view of one end coil of the assembly shown in FIG. 9.
Figure 11:
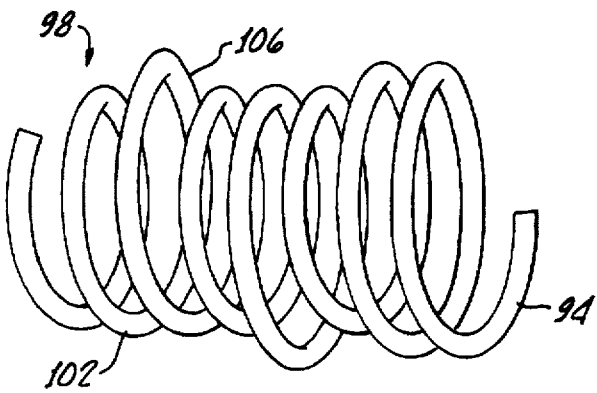
FIG. 11 is a top view of another end coil of the assembly shown in FIG. 9, specifically showing portions of elliptical coils thereof for causing the locking action.

Turning now to FIG. 9, there is shown another embodiment 90 of the present invention, having intermediate coils 92, 94 with end coils 96, 98 as more clearly set forth in FIGS. 10–13. As most clearly shown in FIGS. 14–16, end coils 100, 102 are elliptical. As shown in FIG. 11, at least one end coil 106 is offset in order to provide a three-area point contact, or locking point for reducing the deflection load of the spring 90 in the area of the coupled end coils 96, 98. As shown in FIG. 9, the three areas are locking points, upper locking point 108; a lower back angle, locking point 110; and a lower front angle, locking point 112 (see also FIGS. 14–16). These locking points are achieved when the end coil 102 is threaded into the end coil 100 in the direction of the arrows 114, 116, as shown in FIG. 9. The assembly is further facilitated by the tapered end coils 98 as indicated by the lead lines 120 shown in FIG. 9.

Turning now to FIGS. 17–24, there is shown yet another embodiment 124 of the present invention similar to that shown in FIGS. 9–16, which includes intermediate coils 126, 128 and end coils 130, 132 with the end coil 132 tapered, as indicated by the arrow 134 shown in FIG. 17. Individual offset coils 138, 140, 142, 144, most clearly seen in FIG. 19, provide six locking areas or points which are staggered axially, the points being illustrated at points 148, shown in FIG. 21. The contact points are further illustrated in FIGS. 22–24. As hereinabove described in connection with the embodiment 90, the contact points occur on assembly of the end coil 132 into the end coil 130 by clockwise rotation, indicated by the arrows 150 in FIG. 17, as the end coil 132 couples into the end coil 130, as shown by the arrow 152 in FIG. 17.

The staggered contact area arrangement enables compression of the spring assembly without significant change in its load deflection characteristics in the area of the coupling end coils 130, 132.

Figure 25:
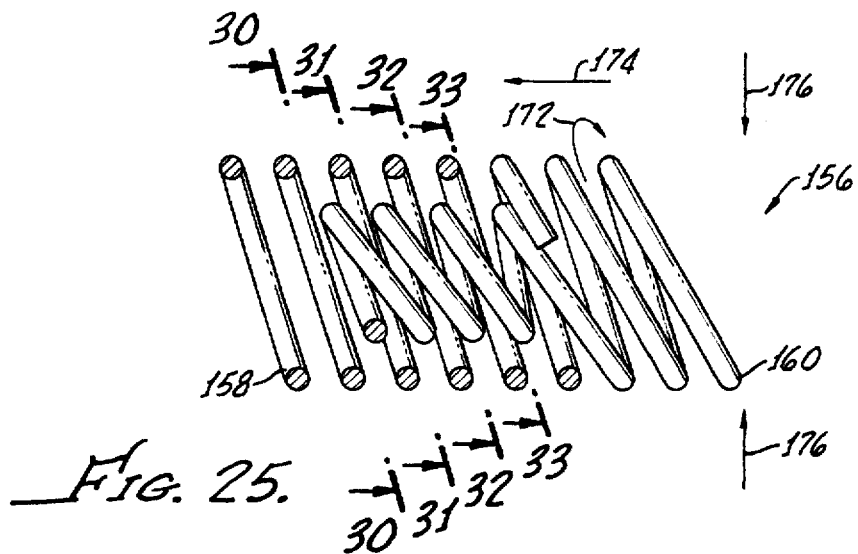
FIG. 25 is a cutaway side view of an assembled coil spring in accordance with yet another embodiment of the present invention.
Figures 26, 27:
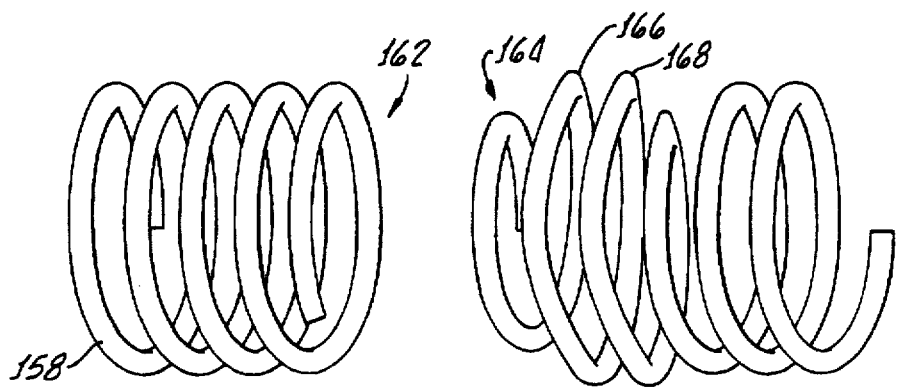
FIG. 26 is a top view of an end coil of the assembly shown in FIG. 25.
FIG. 27 is a top view of another end coil shown in FIG. 25.

Turning now to FIG. 25, there is shown yet another embodiment 156 of the present invention, with the intermediate coils 158, 160, 162, 164 (see FIGS. 26 and 27). This embodiment features an end coil 164 having a smaller coil height than the coil height of the intermediate coils 160 to permit greater deflection of the intermediate canted coils 160 along a minor axis, that is, the end coil 164 is "stepped down" from the intermediate coil 160. It should be appreciated that, while the coils are shown as having a right-hand thread, they may also be formed with a left-hand thread.

As illustrated in FIGS. 30–33, contact locking area is along the major axis 164 due to the protruding configuration-of individual end coils 166, 168 (see FIG. 27).

Figures 28, 29:
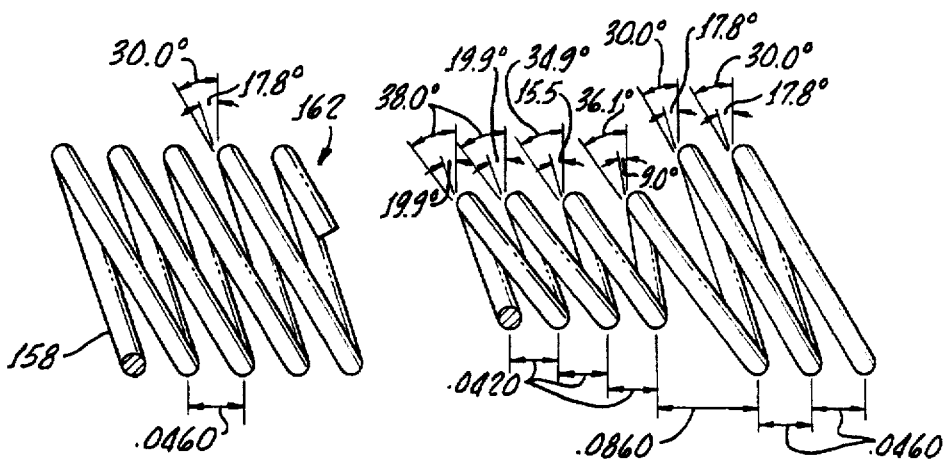
FIG. 28 is a side view of the end coil shown in FIG. 26.
FIG. 29 is a side view of the end coil shown in FIG. 27.
Figure 30:
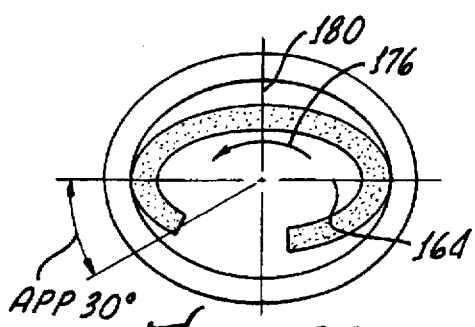
FIG. 30 is a view of the spring assembly shown in FIG. 25, taken along the line 30—30.
Figure 31:
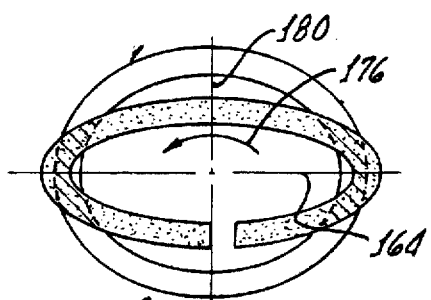
FIG. 31 is a view of the assembly shown in FIG. 25, taken along the line 31—31.
Figure 32:
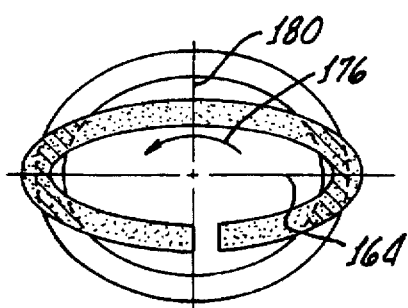
FIG. 32 is a view of the assembly shown in FIG. 25, taken along the line 32—32.
Figure 33:
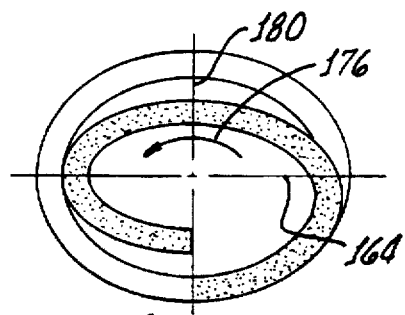
FIG. 33 is a view of the assembly shown in shown in FIG. 25, taken along the line 33—33.

It is to be appreciated that the end coils 162 have a diameter equivalent to the intermediate coils 158, as shown in FIG. 26, while only the end coils 164 have a smaller, or step down, diameter, as shown in FIG. 29. As hereinbefore discussed, variable back angles, as illustrated on the diagram, create interference and the locking grip between the end coils, as illustrated in FIGS. 30–33. This unlocking occurs when the end coils 162, 164 are assembled by a clockwise winding, as indicated by the arrow 172, as shown in FIG. 25, as the end coil 164 is inserted into the end coil 162 in the direction of the arrow 174, also shown in FIG. 25. This assembly is suitable for end coils which are wound in a counterclockwise direction, as indicated by the arrows 176 in FIGS. 30–33.

It should be apparent that due to the reduced diameter of the end coils 164, deflection of the spring assembly embodiment 156, as indicated by the arrows 176 along the minor axis 180 (see FIGS. 30–33), is possible without significant change in the load deflection characteristics of the spring assembly 156 in the area of the coupled end coils 162, 164. This embodiment is particularly suitable when deflection of the end coils 158, 160 along the minor axis 180 is desired with threading locking. The deflection of the coils at the locking ends result in higher force and greater range of deflection of the intermediate coils 160, without substantial change.

Yet another embodiment 186 of the present invention is shown in FIGS. 34–41, which includes intermediate coils 188, 190 and end coils 192, 194.

Figure 35:
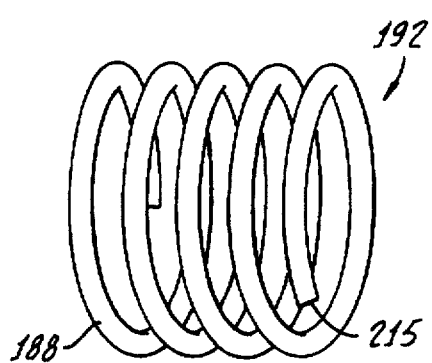
FIG. 35 is a top view of an end coil of the assembly shown in FIG. 34.
Figure 36:
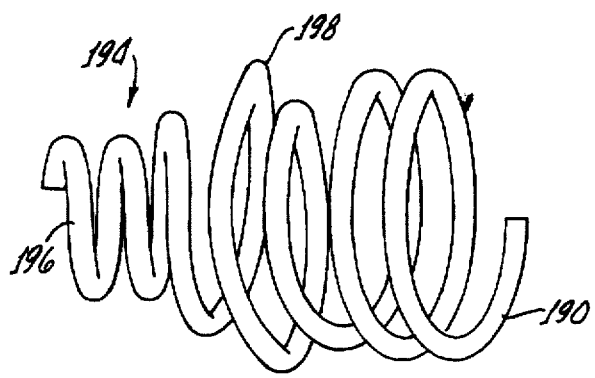
FIG. 36 is a top view of another end coil of the assembly shown in FIG. 34.
Figure 37:
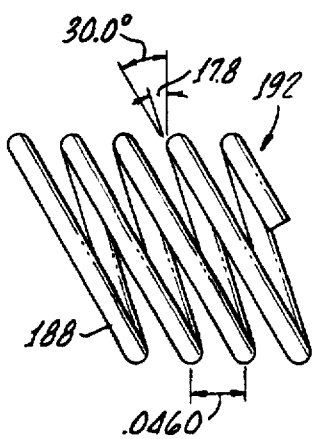
FIG. 37 is a side view of the end coil shown in FIG. 35.
Figure 38:
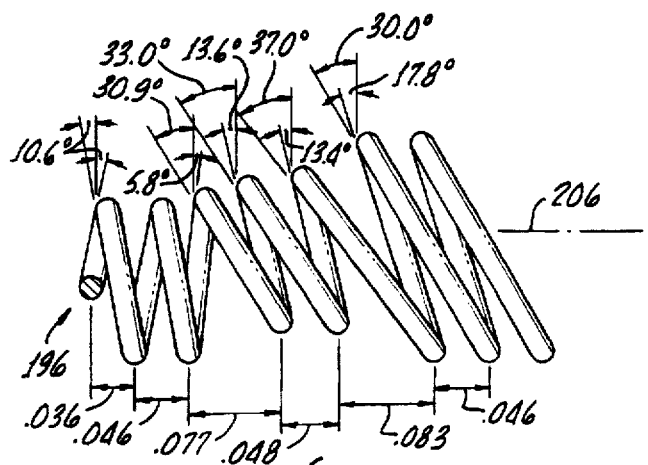
FIG. 38 is a side view of the end coil shown in FIG. 36.
Figure 39:
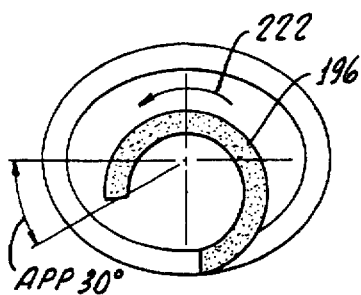
FIG. 39 is a view of the assembly shown in FIG. 34, taken along the line 39—39.

As shown in FIG. 35 and as most clearly evident in FIG. 39, the end coils 192 include at least one individual round coil 196 to provide a deflection stop; and an elliptical locking coil 198 is extended from the intermediate coils 190 with variable back angles 200, 202 (see FIG. 38). To create interference, there is a reverse locking grip between the end coils.

Figure 34:
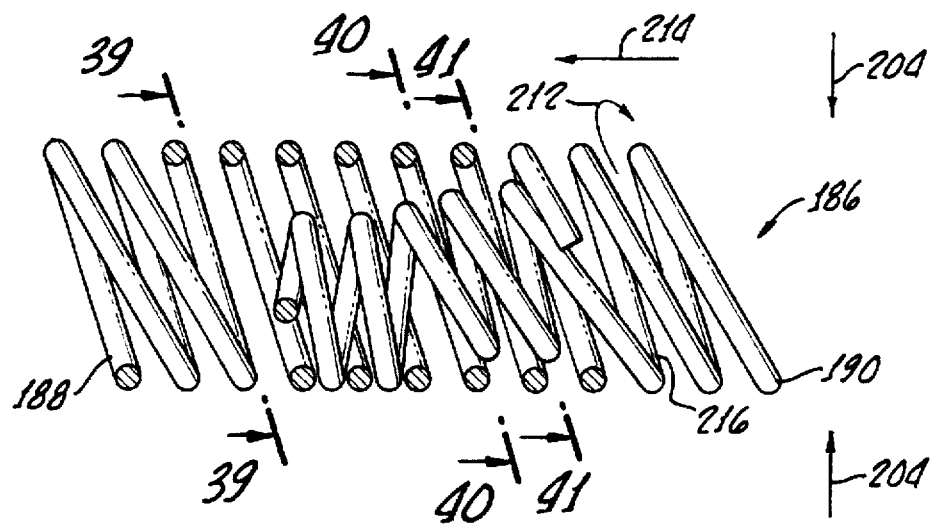
FIG. 34 is a cutaway side view of an assembled coil spring configuration, in accordance with still another embodiment of the present invention.
Figure 40:
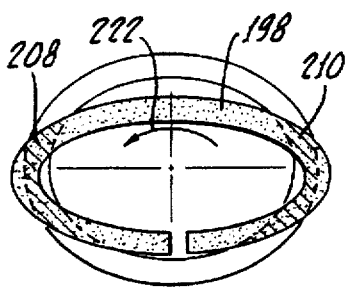
FIG. 40 is a view of the assembly shown in FIG. 34, taken along the line 40—40.
Figure 41:
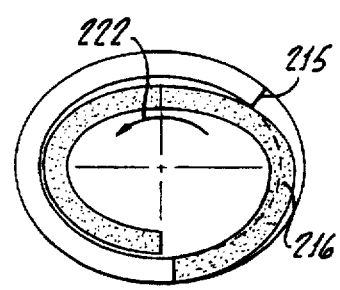
FIG. 41 is a view of the assembly shown in FIG. 34, taken along the line 41—41.
Figure 42:
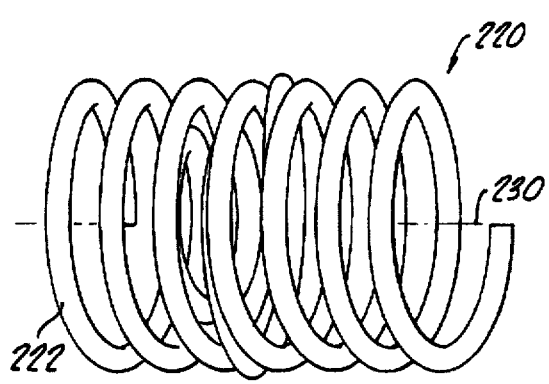
FIG. 42 is a top view of an assembled spring apparatus, in accordance with another embodiment of the present invention.
Figure 43:
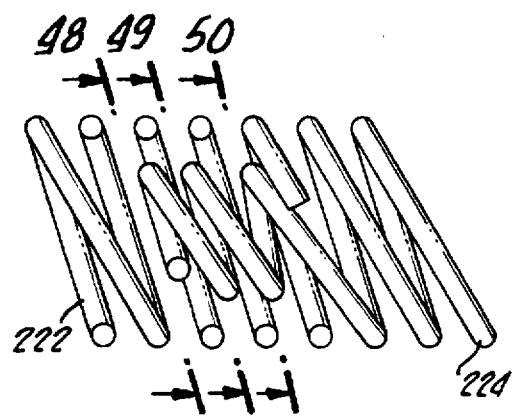
FIG. 43 is a cutaway side view of the assembly shown in FIG. 42.
Figure 44:
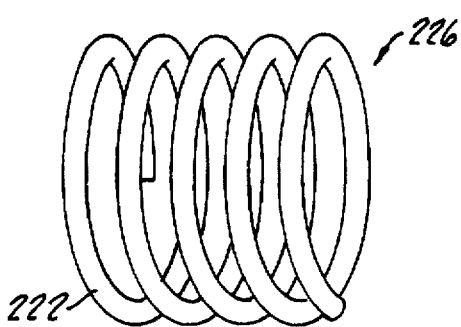
FIG. 44 is a top view of one end coil of the assembly shown in FIG. 42.

The deflection stop occurs when the intermediate coils are compressed down to the diameter of the round coils in the direction of arrow 204, as shown in FIG. 34. In this embodiment, the end coils 194 are tapered asymmetric to the centerline 206 to the intermediate coils 188, 190 and spring assembly 186. Locking is provided by engagement areas 208, 210, as shown in FIG. 40, provided by the coil 198 contact with intermediate coil 186 (see FIG. 40). Again, assembly is accomplished by rotating the end coil 194 into the end coil 192 as indicated by the arrow 212 in FIG. 34, causing engagement of the end coil 194 into the end coil 192 in the direction of arrow 214. In this embodiment, a locking end 215, end coil 191 provides a stop as indicated by position 214 in FIGS. 34 and 41 by contact with a first individual end coil 216, four coils wound in a counterclockwise manner, as indicated by the arrow 222 in FIGS. 39–41. Thus, the spring assembly 186 is assembled by threading the end coils 192, 194 together until positive stop is encountered.

Turning now to FIGS. 42–50, there is shown an alternative embodiment 220 of the spring assembly, or apparatus, wherein intermediate coils 222, 224 and end coils 226, 228 are canted along a centerline 230 with each intermediate coil 224 having a leading portion 234 disposed at a front angle 236 to a normal line 238 and a trailing portion 242 disposed at a back angle 234 to the normal line 238. Preferably, the intermediate coils 222, 224 and end coils 226, 228 are elliptical, and an elliptical shape of at least one individual end coil 248 includes extended portions 250, 252 (see FIG. 45) for causing the end coils 226, 228 to snap together with the portions 250, 252 extending exterior to the circumference of end coils 226.

Referring specifically to FIGS. 49 and 50, this provides for engagement between the end coils at alternate selected points 260, 262.

Yet another embodiment 266 of the present invention is shown in FIGS. 51–59, which includes intermediate coils 266, 268 and end coils 270, 272.

This embodiment 266 is similar to embodiment 220, shown in FIGS. 42–50, except that two individual end coils 276, 278 have a coil height measured along a minor axis 280 (see FIGS. 57–59) which is substantially smaller than an intermediate coil height measured along the minor axis. This provides for four contact areas 282, 284, 286, 288, as shown in FIGS. 57–59.

Figure 45:
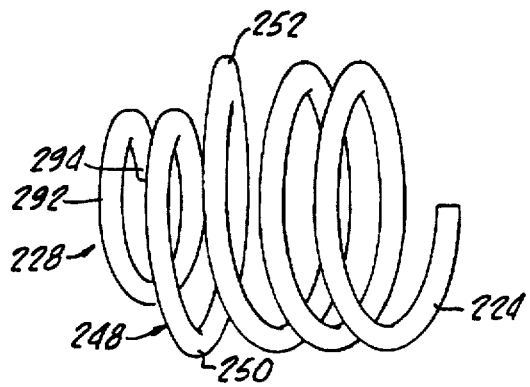
FIG. 45 is a top view of another end coil of the assembly shown in FIG. 42.
Figure 46:
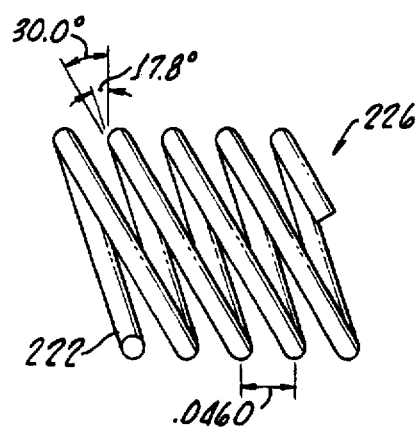
FIG. 46 is a side view of the end coil shown in FIG. 44.
Figure 47:
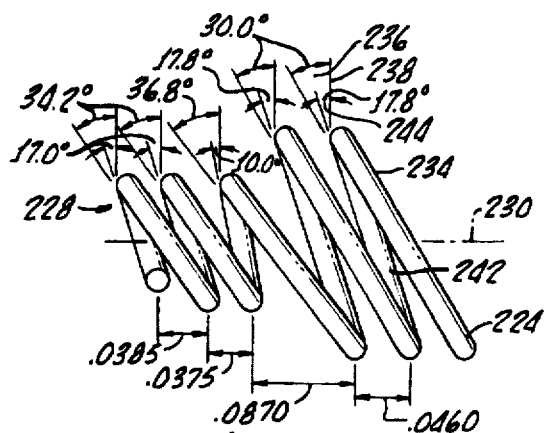
FIG. 47 is a side view of the end coil shown in FIG. 45.
Figure 55:
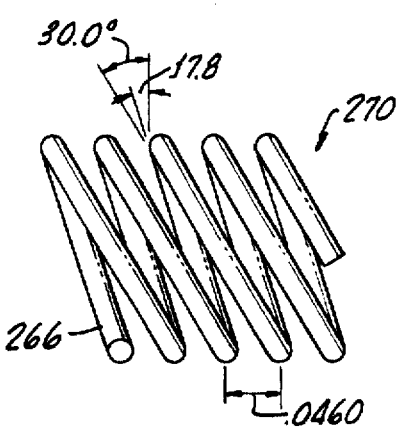
FIG. 55 is a side view of the end coil shown in FIG. 53.
Figure 56:
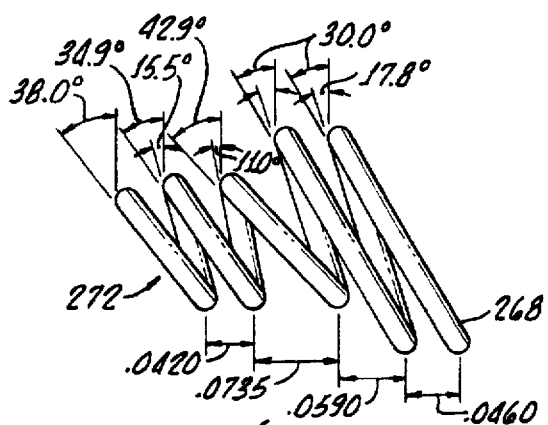
FIG. 56 is a side view of the end coil shown in FIG. 54.
Figure 57:
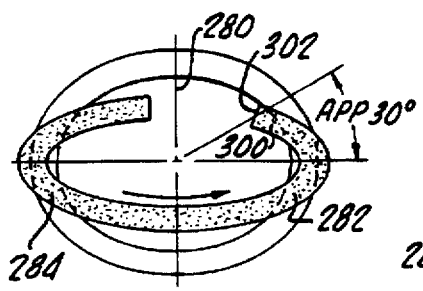
FIG. 57 is a view of the assembly shown in FIG. 52, taken along the line 57—57.
Figure 58:
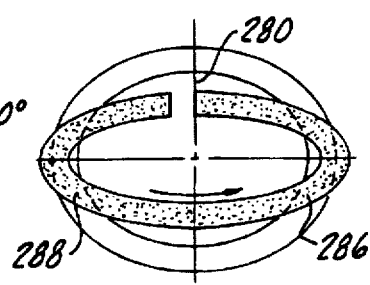
FIG. 58 is a view of the assembly shown in FIG. 52, taken along the line 58—58.

Another distinguishing difference between the embodiments 220, 266 is that the location of the leading end coil 292 of the spring apparatus 220 has an end 294, as shown in FIGS. 45 and 48, which is disposed in a lower left quadrant (see FIG. 48) whereas a leading end coil 300 of the spring apparatus 266 has an end 302 disposed in an upper right quadrant, as shown in FIGS. 54 and 57.

Figure 59:
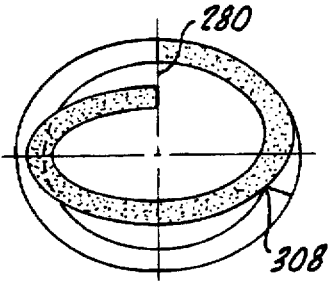
FIG. 59 is a view of the assembly shown in FIG. 52, taken along the line 59—59.

Also, as shown in FIGS. 50 and 59, the end coils 226, 270, respectively, provide positive stops upon assembly, the position of which is indicated at 306 and 308, respectively, in FIGS. 50 and 59.

Alternative embodiments 310, 312, 314, 316, 318 and 320, in accordance with the present invention, are shown respectively in FIGS. 60–71.

Figure 60:
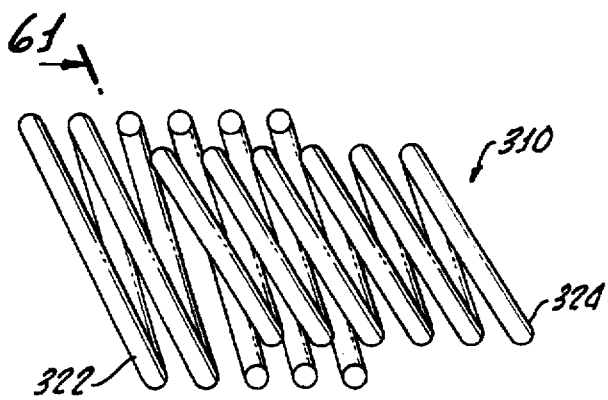
FIG. 60 is a cutaway side view of a spring assembly, in accordance with the present invention utilizing a circular canted spring with an elliptical snap-on coupling.
Figure 61:
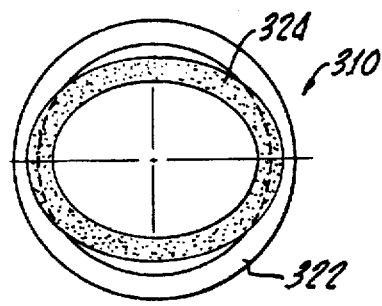
FIG. 61 is a view of the assembly shown in FIG. 60, taken along the line 61—61.
Figure 62:
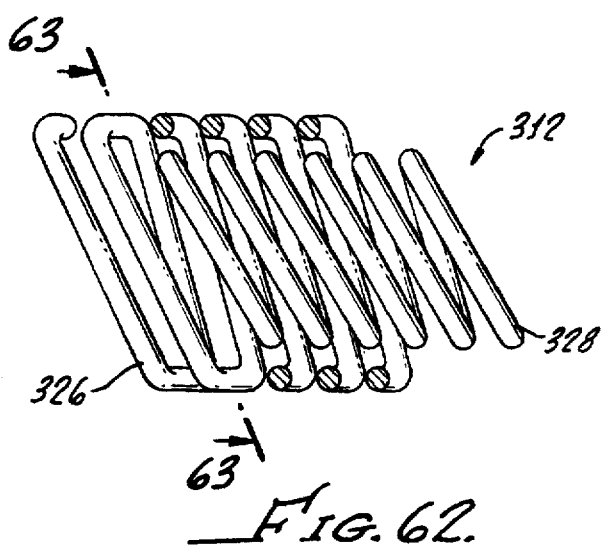
FIG. 62 is a cutaway side view of a spring assembly, in accordance with the present invention, wherein the intermediate coils are square, and the end coils are elliptical.
Figure 63:
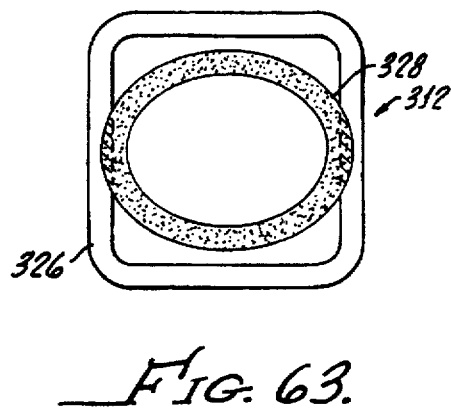
FIG. 63 is a view of the spring assembly shown in FIG. 62, taken along the line 63—63.

As shown in FIGS. 60 and 61, embodiment 310 includes circular intermediate coils 322 with elliptical end coils 324. The embodiment 312 in FIGS. 62 and 63 includes square intermediate coils 326 and elliptical snap-on end coils 328.

Figure 64:
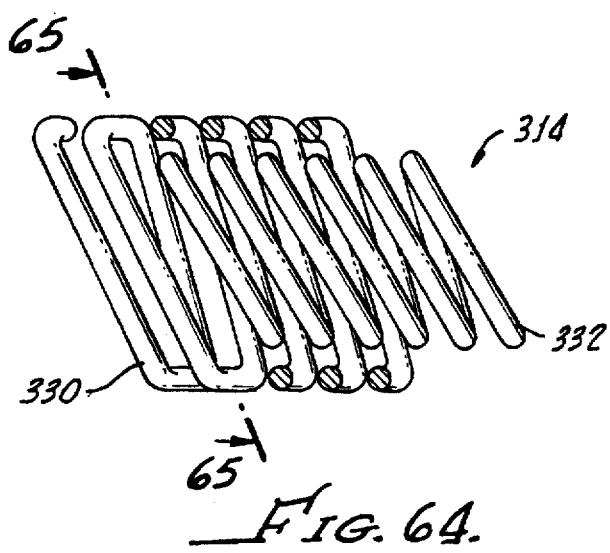
FIG. 64 is a cutaway side view of a spring assembly, utilizing rectangular intermediate coils and circular end coils.
Figure 65:
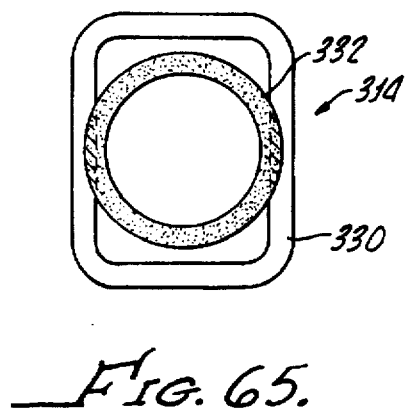
FIG. 65 is a view of the spring assembly shown in FIG. 64, taken along the line 65—65.

The embodiment 314 shown in FIGS. 64 and 65 includes rectangular intermediate coils 330 and round snap-on end coils 332.

Figure 66:
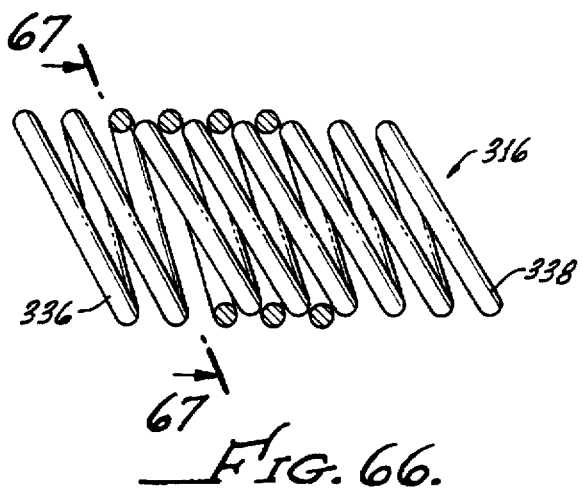
FIG. 66 is a cutaway side view of a spring assembly, utilizing circular intermediate coils with circular canted end coils for snap-on engagement.
Figure 67:
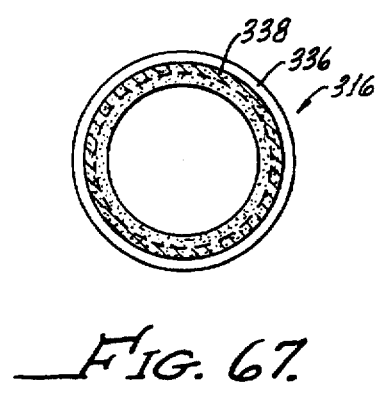
FIG. 67 is a view of the spring assembly shown in FIG. 66, taken along the line 67—67.
Figure 68:
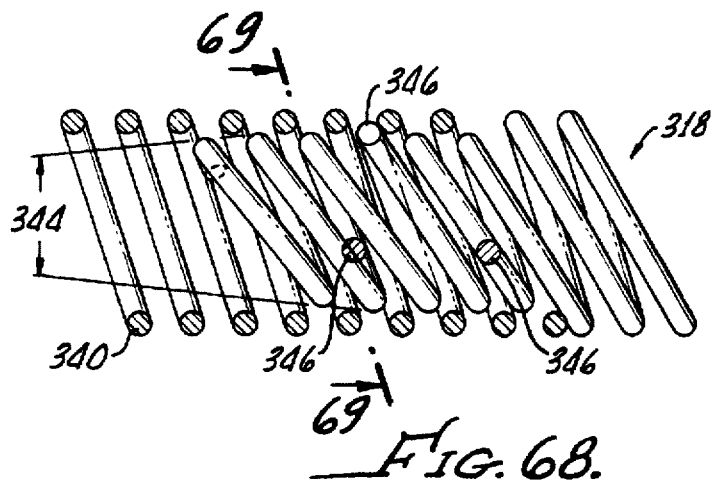
FIG. 68 is a cutaway side view of a spring assembly, utilizing elliptical canted intermediate coils and elliptical end coils.

Turning to FIGS. 66 and 67, the embodiment 316 shown therein includes circular intermediate coils 336 with circular snap-on end coils 338. The embodiment 318 shown in FIGS. 68 and 69 includes elliptical canted intermediate coils 340 with elliptical end coils 342 which are tapered, as indicated by the arrow 334, and include three locking points indicated at 346.

Figure 69:
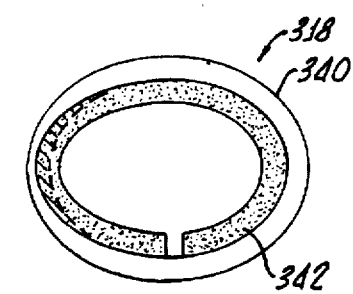
FIG. 69 is a view of the spring assembly shown in FIG. 68, taken along the line 69—69.
Figure 70:
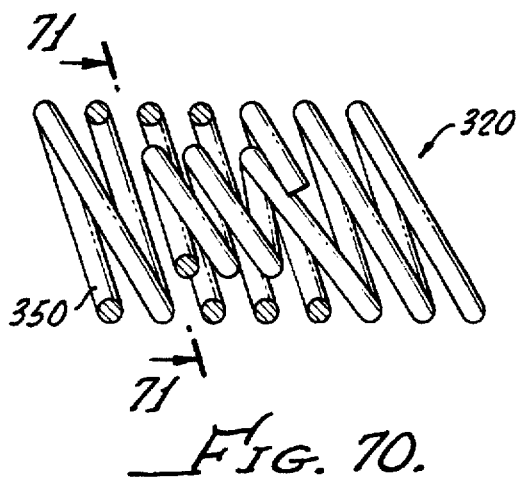
FIG. 70 is a cutaway side view of an assembly of an embodiment of the present invention similar to that shown in FIG. 68.
Figure 71:
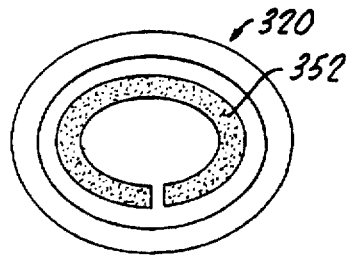
FIG. 71 is a view of the spring assembly shown in FIG. 70, taken along the line 71—71.

FIGS. 70 and 71 illustrate the embodiment 320 which utilizes elliptical intermediate coils 350 and elliptical end coils 352 for providing screw-in engagement, with two locking points located at opposite ends of the next-to-the-last leading coils, similar in construction to FIG. 69, but not shown.

Turning now to FIGS. 72–76, there is yet another embodiment 356, in accordance with the present invention, having intermediate coils 358, 360 canted along a centerline 362 and having leading portions 364 and trailing portions 366, as hereinbefore describe. End coils 370, 372 are easily distinguished from earlier described embodiments in that the diameter thereof is substantially smaller than the diameter of the intermediate coils 358, 360.

Further, as most clearly shown in FIGS. 73 and 74, the end coils 370 extends outwardly from the intermediate coils 364 along the centerline and the end coil 372 is a female end coil disposed interior to the intermediate coil 360. The embodiment 356 is assembled by threading the end coil 370 into the end coil 372 until the outer portions contact and match one another. It should be evident that, because the end coils 370, 372 are substantially smaller than the intermediate coils 358, 360, deflection of the intermediate coils 358, 360, as indicated by the arrows 374, depression of the coils 358, 360 in the area of the union of the end coils 370, 372 does not affect the load deflection characteristics of the spring assembly 356. FIGS. 75 and 76 offer end views of the coils 358, 360, 370, 372 and further illustrate the freedom of movement available to the intermediate coils 358, 360.

Figure 77:
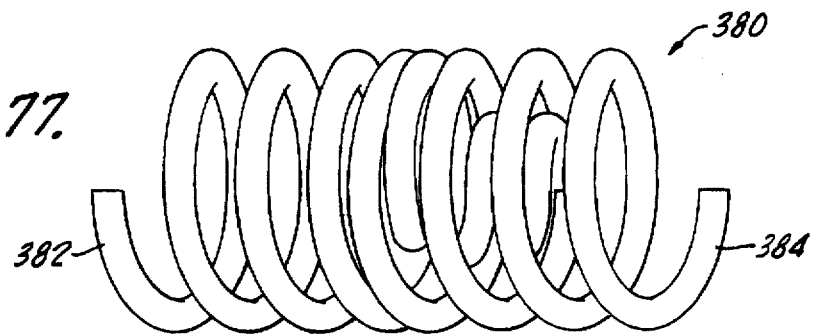
FIG. 77 is a top view of a spring assembly similar to that shown in FIG. 72 in which the end coils are spaced apart.
Figure 78:
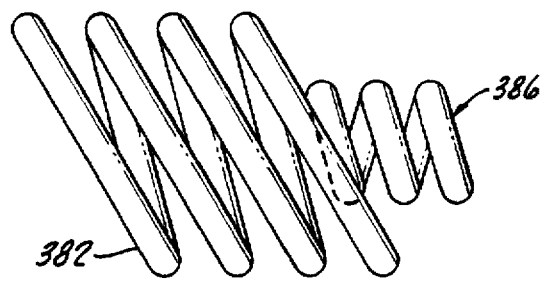
FIG. 78 is a side view of an end coil of the spring assembly shown in FIG. 77.
Figure 79:
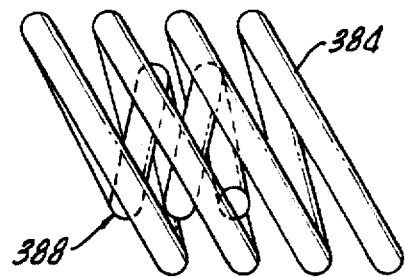
FIG. 79 is a side view of another end coil of the spring assembly shown in FIG. 77.

Another embodiment 380, similar to the embodiment 356, is shown in FIGS. 77–79. The coil assembly 380 includes intermediate coils 382, 384, which may be elliptical, and end coils 386, 388, as more clearly shown in FIGS. 78 and 79.

FIG. 77 is a top view of the spring apparatus 380 while FIGS. 78 and 79 are side views of the spring apparatus 380 prior to assembly. End coils 386 extend outwardly from the intermediate coils 382 in a spaced apart manner, as shown in FIG. 78. End coils 388, disposed within the intermediate coils 384, are sized for accepting the end coils 386 in a manner described in connection with the spring apparatus 356.

Figure 80:
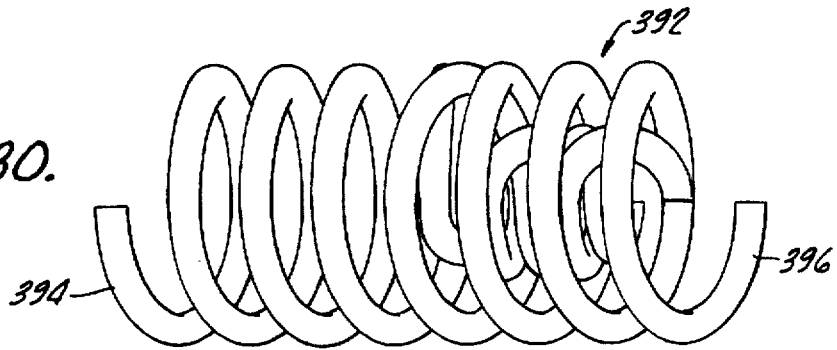
FIG. 80 is a top view of another spring assembly similar to that shown in FIG. 77 in which one end coil is tapered.
Figure 81:
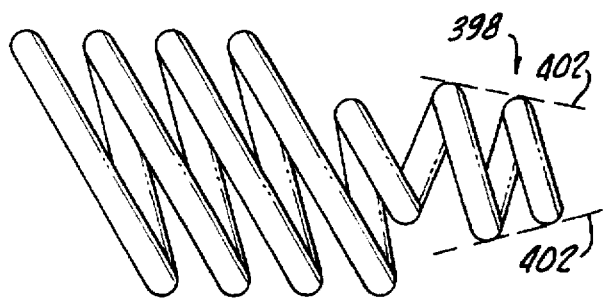
FIG. 81 is a side view of an end coil of the spring assembly shown in FIG. 80.
Figure 82:
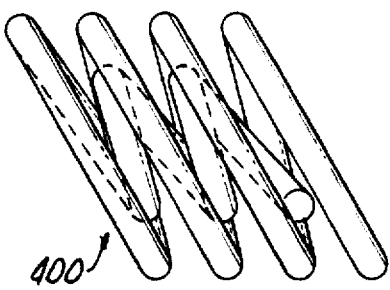
FIG. 82 is a side view of another end coil of the spring assembly shown in FIG. 80.

Yet another embodiment 392 is shown in FIGS. 80–82, FIG. 80 being a top view at assembly of the spring apparatus 392. Similar to the spring apparatus 380, intermediate coils 394, 396 may be elliptical, as well as end coils 398, 400.

However, in the spring apparatus 392 illustrated in FIGS. 80–82, the male end coils 398 are both spaced apart and tapered, the taper being illustrated with dashed lines 402. Assembly of the spring apparatus 392 is in accordance with the assembly procedures describing the spring assembly 356.

Figure 83:
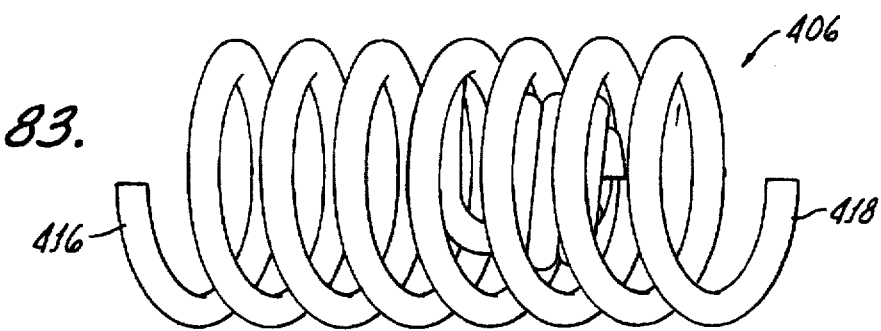
FIG. 83 is a top view of a spring assembly in which the end coils include abutting tapered coils.
Figures 84, 85:
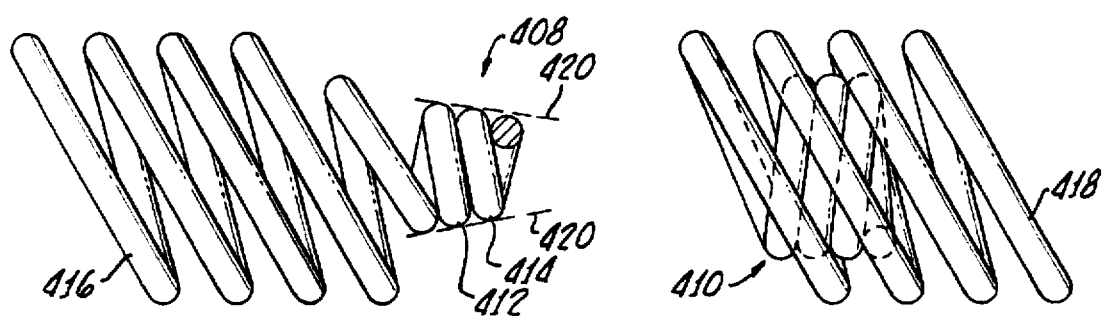
FIG. 84 is a side view of an end coil of the spring assembly shown in FIG. 83.
FIG. 85 is a side view of another end coil of the spring assembly shown in FIG. 83.

Still another embodiment 406, in accordance with the present invention, is shown in FIGS. 83–85, with the FIG. 83 being a top view of the assembled spring apparatus 406, and FIG. 84 being a side view of an end coil 408 prior to assembly. FIG. 85 is a side view of end coil 410 prior to assembly. This embodiment 406 is similar to the spring apparatus 356 which includes abutting individual end coils 412, 414 which have a substantially smaller diameter than intermediate coils 416, 418. The end coil 408 is distinguished over the end coil 370 (see FIG. 73) in that in addition to abutting, the end coils 412, 414 are tapered as indicated by the dashed line 420.

Figure 86:
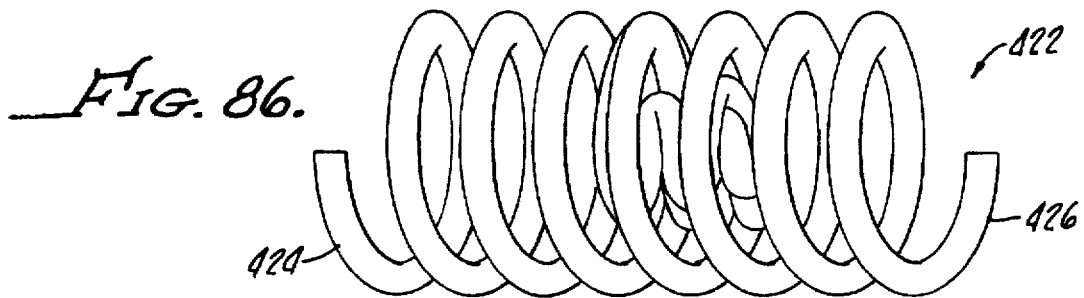
FIG. 86 is a spring assembly similar to that shown in FIG. 83 with separate tapered end coils.
Figures 87, 88:
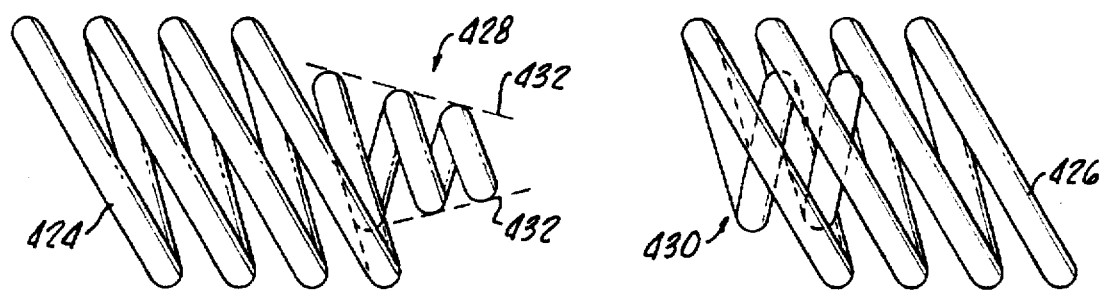
FIG. 87 is a side view of an end coil of the spring assembly shown in FIG. 86.
FIG. 88 is a side view of another end coil of the spring assembly shown in FIG. 86.

FIG. 86 shows the top view of another embodiment 422 of the present invention, which includes intermediate coils 424, 426 congruent with end coils 428, 430. This spring arrangement 422 is similar to the spring arrangement 406 except that the end coils 428 are spaced apart and tapered, as indicated by the dashed line 432.

Yet another embodiment 434, in accordance with the present invention, is illustrated in FIGS. 89a, 89b, 90a, 90b, and 91, FIG. 91 being a cutaway side view of the assembled spring apparatus 434. The spring apparatus 434 includes square intermediate coils 436, 438, and is most clearly shown in FIGS. 89b and 90a around end coils 440, 442.

Figure 92:
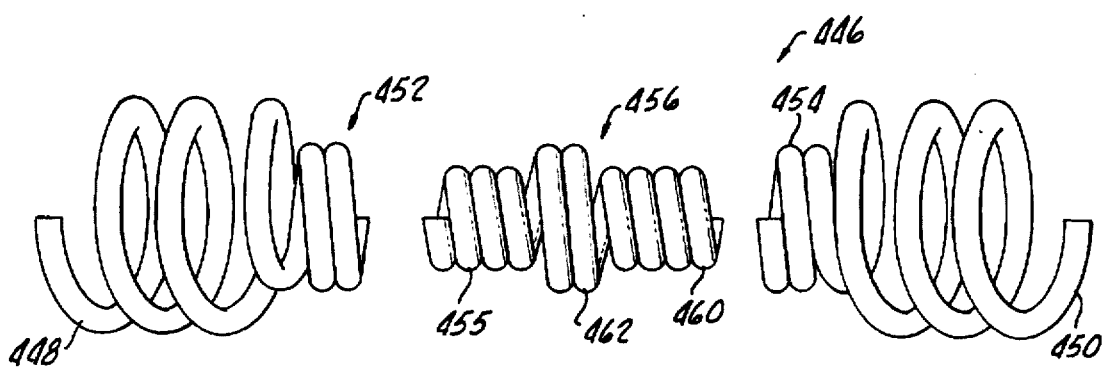
FIG. 92 is a top view of an alternative embodiment of the spring assembly, in accordance with the present invention, utilizing two end coils and an insert coil.

Turning now to FIG. 92, there is shown yet another embodiment 446 before assembly, generally showing intermediate coils 448, 450, which may be elliptical, end coils 452, 454, which are abutting and of substantially smaller diameter than the intermediate coils 448, 450, along with an insert coil 456.

Figure 93:
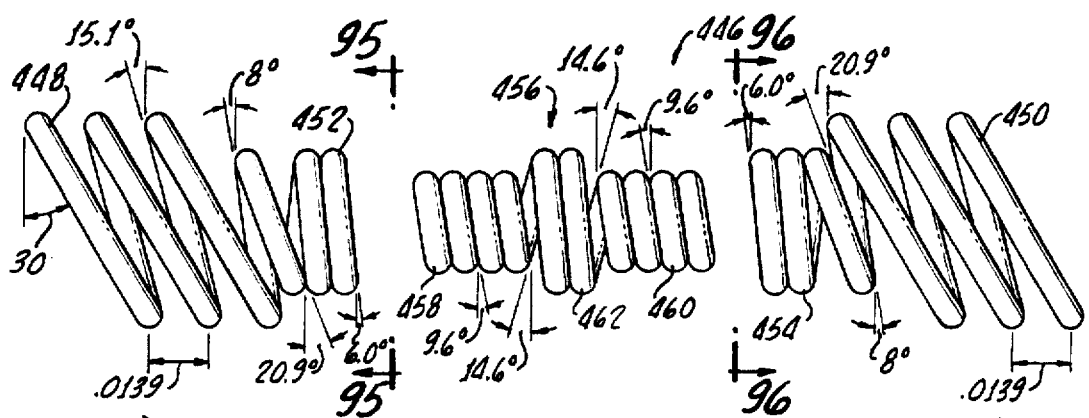
FIG. 93 is a side view of the spring assembly shown in FIG. 92.

In this embodiment, both the end coils 452, 454 are female and the insert coil 456 includes male portions 458, 460 sized for insertion into the end coils 452, 454 with center coils 462 providing a stop. A side view of the spring apparatus 446 is shown in FIG. 93 prior to assembly, with each of the characterizing angles of the intermediate coils 448, 450, end coils 452, 454, as well as the insert coil 456 being indicated in the figure.

Figure 94:
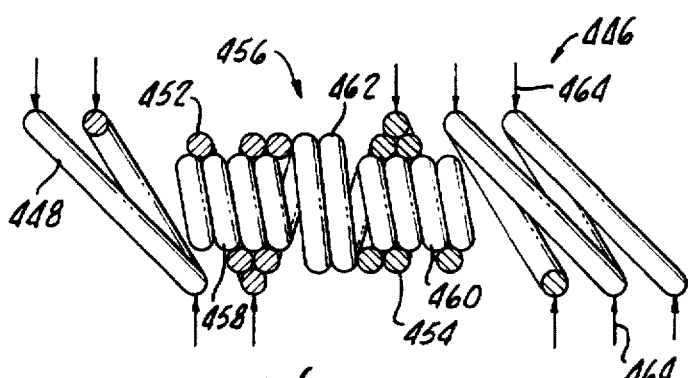
FIG. 94 is a partially cutaway side view of the coil assembly shown in FIG. 92 when fully assembled.

FIG. 94 shows a cutaway spring assembly 446 at maximum deflection when compressed in the direction of arrows 464 showing the end coils 452, 454 in cross-section.

It should be evident from FIG. 94 that the reduced diameter of the end coils 452, 454, as well as the insert coils 456, enable the intermediate coils to deflect without bearing against the same and therefore enabling the intermediate coils a constant load deflection characteristic throughout a length thereof.

Figure 95:
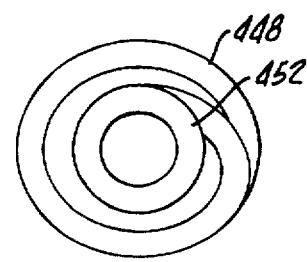
FIG. 95 is a view of the spring assembly shown in FIG. 93 taken along the line 95—95.
Figure 96:
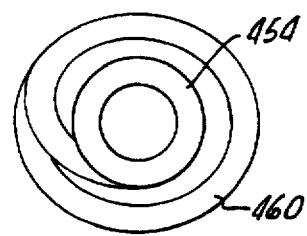
FIG. 96 is a view of the spring assembly shown in FIG. 93 taken along the line 96—96.

In this embodiment, the end coils 452, 454 may be round, as shown in FIGS. 95 and 96.

Figure 97:
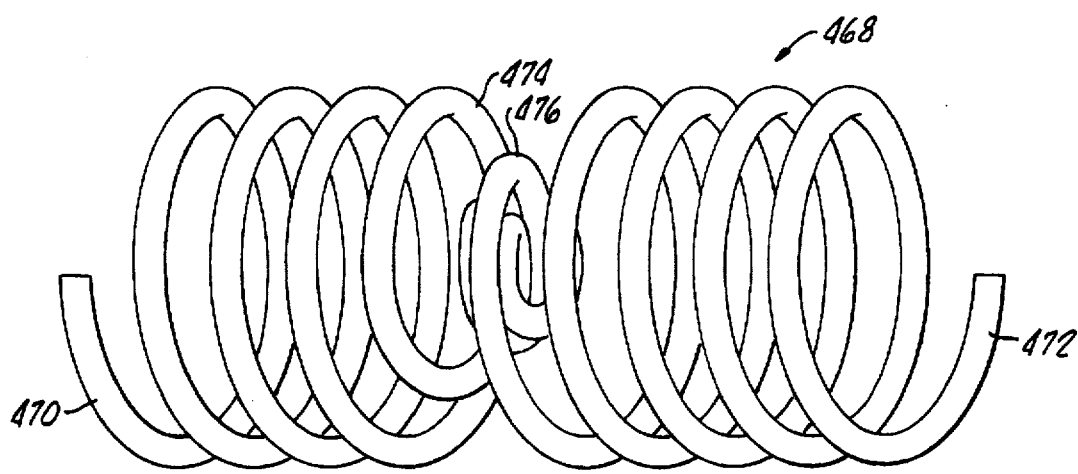
FIG. 97 is a top view of an alternative embodiment of the present invention, similar to FIG. 77, in which both the male and female end coils are exterior to the intermediate coils.
Figure 98:
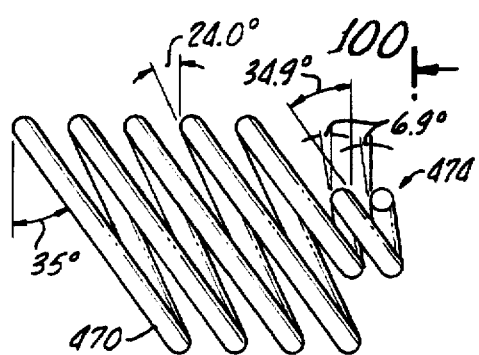
FIG. 98 is a side view of an end coil of the spring assembly shown in FIG. 97.
Figure 99:
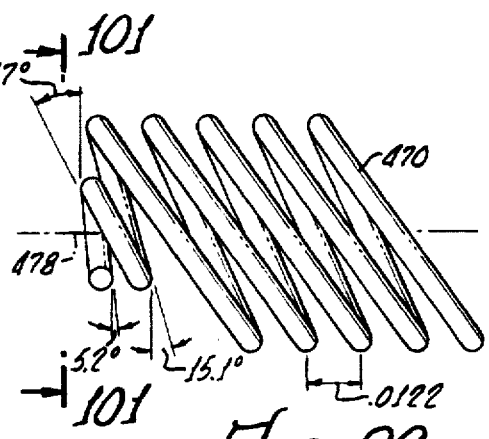
FIG. 99 is a side view of another end coil of the spring assembly shown in FIG. 98 in which the female end coil is exterior to the intermediate coils.

Still another embodiment 468 of the present invention is shown in FIGS. 97–102, with FIG. 97 being a top view of the spring assembly 468. The spring assembly 468 is similar to the spring assembly 380 shown in FIGS. 77–79 with an important distinguishing feature, as hereinafter set forth.

Figure 100:
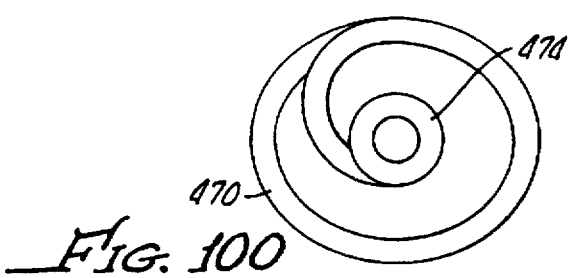
FIG. 100 is a view of the end coils shown in FIG. 98 taken along the line 100—100.
Figure 101:
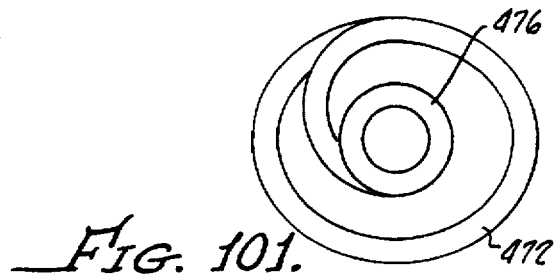
FIG. 101 is a view of the end coil shown in FIG. 99 taken along the line 101—101.

The spring apparatus 468 includes intermediate coils 470, 472, with end coils 474, 476, which may be circular, as shown in FIGS. 100 and 101. Specific angular definition of the intermediate coils 470, 472 and end coils 474, 476 are set forth directly on FIGS. 98 and 99, which are side views of the end coils 474, 476, respectively.

In this embodiment 468, the end coils 474 protrude outwardly from the intermediate coils 470 along a centerline 478. In contrast with the assembly 380, as shown in FIGS. 77–79, the end coils 476 comprise female coils extending outwardly from the intermediate coils 470 and sized for engagement with male coils 474. The size differential is illustrated in FIGS. 100 and 101.

Figure 102:
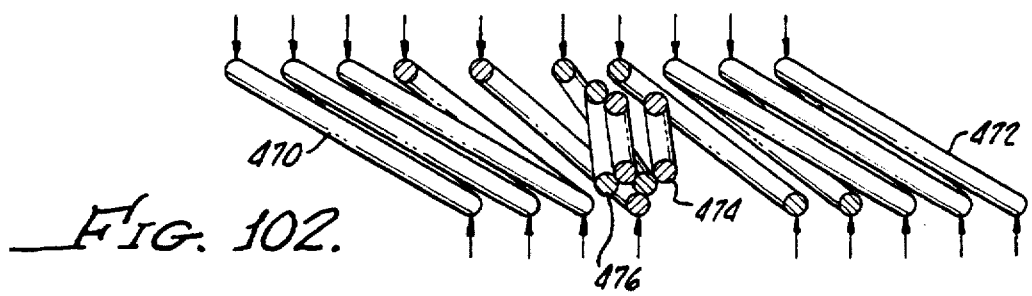
FIG. 102 is a cutaway side view of the spring assembly shown in FIG. 97 at maximum deflection, illustrating independence of the deflection of the intermediate coils from the coupling end coils.

Because the diameters of the end coils 474, 476 are substantially smaller than the diameters of the intermediate coils 470, 472, the intermediate coils may be deflected (as shown in FIG. 102) without interference by the coupling end coils 474, 476. Thus, a constant load deflection characteristic of the intermediate coils is maintained throughout the length of the spring assembly 468.

Figure 103:
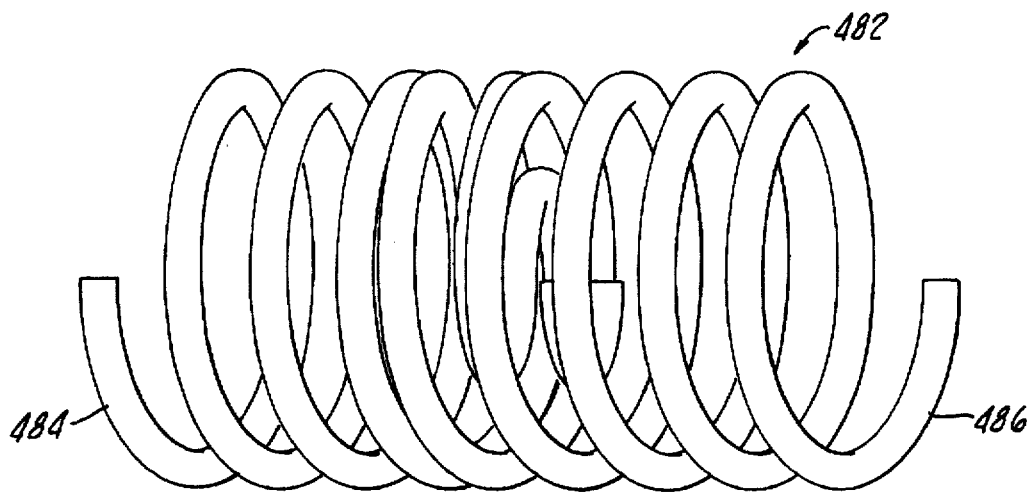
FIG. 103 is a top view of still another embodiment of the present invention, utilizing triangular end coils.
Figure 104:
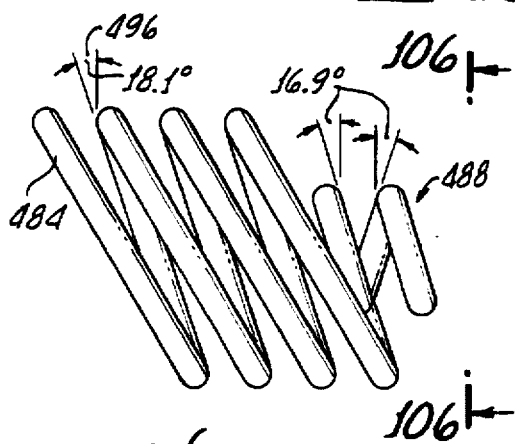
FIG. 104 is a side view of one end coil of the spring assembly shown in FIG. 103.
Figure 105:
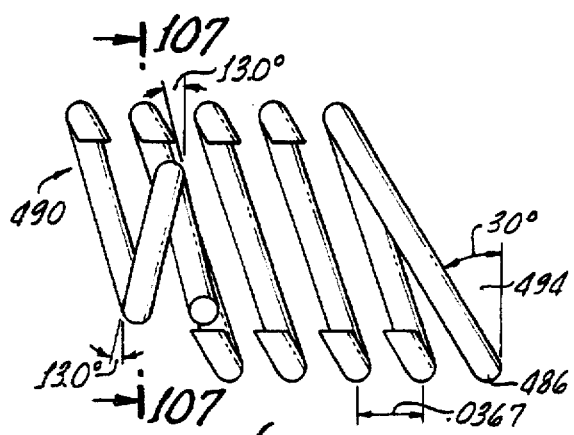
FIG. 105 is a side view of another end coil of the spring assembly shown in FIG. 103.

Turning now to FIGS. 103–108, there is shown another embodiment 482 of the present invention generally including intermediate coils 484, 486 and end coils 488, 490. FIG. 103 is a top view of the assembled spring assembly 482, while FIGS. 104 and 105 are side views of a separated assembly, detailing the front angles 494, back angles 496, as hereinbefore described in connection with earlier presented embodiments of the present invention.

Figure 106:
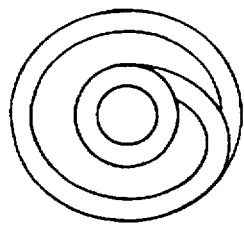
FIG. 106 is a view of the end coil shown in FIG. 104 taken along the line 106—106.
Figure 107:
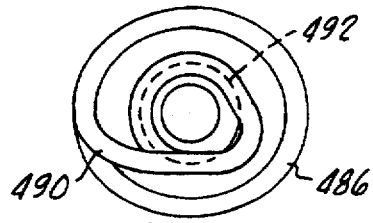
FIG. 107 is a view of the end coil shown in FIG. 105 taken along the line 107—107.

FIGS. 106 and 107 are end views of the end coils 488, 490, respectively, and FIG. 107 most clearly shows a triangular configuration of the end coil 490 which is a feature of the assembly 482. A dotted line at 492 indicates interference locations between the end coils 488, 490 to provide locking of the end coils 488, 490 together, resulting in the spring assembly 482.

Figure 108:
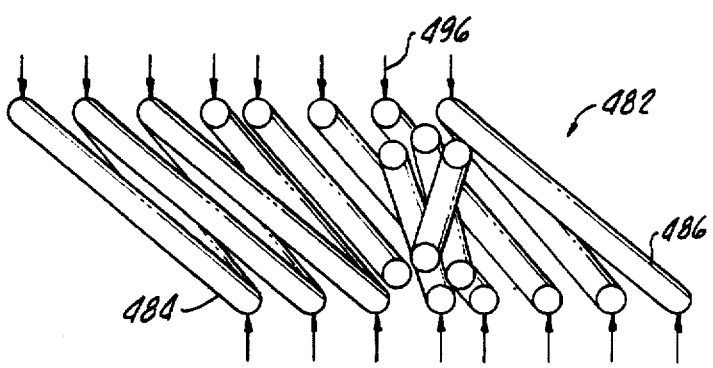
FIG. 108 is a cutaway side view of the spring assembly shown in FIG. 103 at maximum deflection.

FIG. 108 is a cutaway view of the spring assembly 482 at maximum deflection under a force indicated by the arrows 496. It can be seen that in addition to the difference in diameter of the end coils 488, 490 and the intermediate coils 484, 486, the triangular shape of the end coil 490 further enables the compression of the intermediate coils 484, 486, without interference from the end coils 488, 490, thereby not interfering with the load deflection characteristics of the intermediate coils.

FIGS. 109–115 show still another embodiment 510 of the present invention which is similar to the spring assembly 482, shown in FIGS. 103–108.

As shown assembled is a top view of a spring assembly 510 in FIG. 109, generally including intermediate coils 512, 514, and, as more clearly shown in FIGS. 110 and 111, end coils 516, 518. Similar to FIGS. 104 and 105, FIGS. 110 and 111 show the specific configuration of the intermediate coils 512, 514 and end coils 516, 518.

FIG. 112 is an end view of the round end coil 516, which is similar to the end coil 488 of the spring assembly 482 with a greater number of convolutions.

FIG. 113 illustrates the spring assembly 510 at maximum deflection, showing, as also hereinabove set forth with other embodiments of the present invention, deflection of the intermediate coils 512, 514 without interference from the end coils 516, 518.

FIGS. 114 and 115 illustrate the triangular configuration of the end coil 518, which is similar to the end coil 492 of the spring assembly 482, with a greater number of convolutions. Also shown in FIGS. 114 and 115 are dotted lines 522, 524 depicting interference locations between the end coils 516, 518 which provide locking of the spring assembly 510, as illustrated in FIGS. 109 and 115.

FIGS. 116–120 show still another embodiment 530 of the present invention, generally including a plurality of intermediate coils 532, 534 canted along a centerline 536 of the coil spring 530 with each coil 532, 534 having a corresponding leading portion 538, 540, disposed at front angles 542, 554 to normal lines 546, 548 to the centerline 536, and trailing portions 550, 552, disposed at back angles 554, 556 to normal lines 558, 560 to the centerline 536. End coils 564, 566 are congruent respectively with the intermediate coils 532, 536 for providing a joining of the intermediate coils to form the spring assembly, as shown in top view in FIG. 116.

Figure 116:
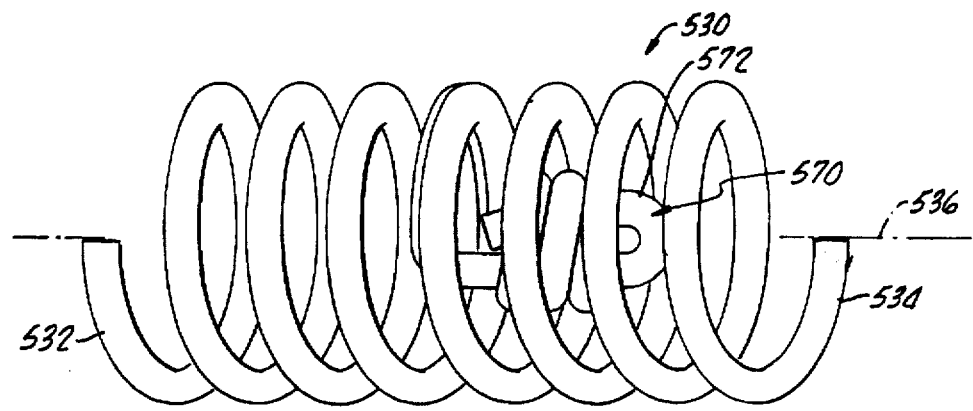
FIG. 116 is a top view of a spring assembly, in accordance with the present invention, utilizing an end locking system with a male hook stem.
Figure 117:
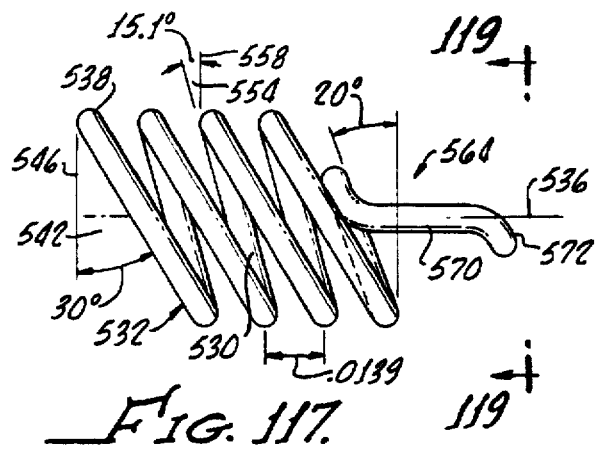
FIG. 117 is a side view of a male end coil of the spring assembly shown in FIG. 116 showing a male hook stem with a bent latch and abutting coils.
Figure 118:
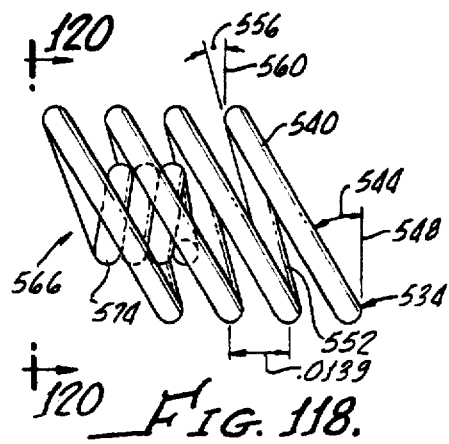
FIG. 118 is a side view of a female end coil of the spring assembly shown in FIG. 116 having round centered coil abutting coils.
Figure 119:
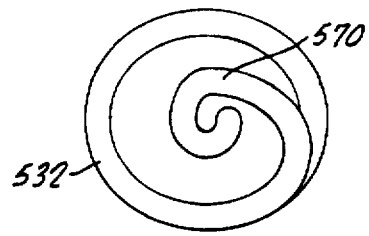
Figure 121:
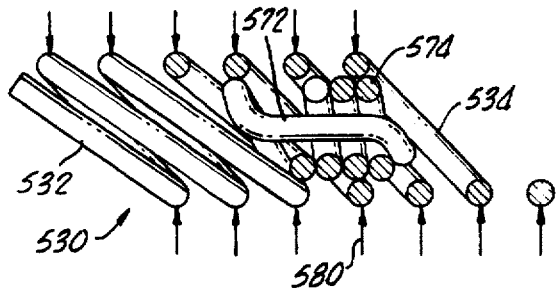
Figure 120:
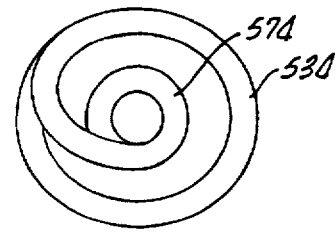

Importantly, the end coils 564 include at least one hook coil 570, including an end bent latch portion 572 (see FIGS. 116 and 117) and abutting female coils 574 having a substantially smaller diameter than intermediate coils 532, 534. Locking is provided when the bent latch portion 572 protrudes through the internal female coils 574, as shown in FIGS. 116 and 121. End views of the end coil 570 are shown in FIG. 119, while the end views of the generally circular end coils 574 are shown in FIG. 120.

A stop is provided upon latching of the two end coils 564, 566 by abutment of the intermediate coils 532, 534, as shown in FIG. 116.

FIG. 121 illustrates the advantage of the present invention by depicting the spring assembly 530 in cross-section at full deflection in response to loading in the direction of arrows 580. As illustrated, full deflection of the intermediate coils 532, 534 may be achieved without interference from the end coils 564, 566, thereby enabling a constant load deflection characteristic of the intermediate coils 532, 534 over the continuous length of the assembly 530.

It should be appreciated that all of the hereinabove recited embodiments may be filled with an elastomer or plastic, having either a solid or a hollow coil. This configuration is illustrated in FIGS. 122–130 which shown an elastomer 184 surrounding a spring assembly 586, having intermediate coils 588, 590 and end coils 592, 594. The purpose of the elastomer is to provide uniform loading, as well as sealing, in addition to providing enhancement of conductivity and electromagnetic shielding, depending upon the consistency of the elastomer exposure of one or more coils or portions of coils to enhance conductivity and/or electromagnetic shielding.

Figure 122:
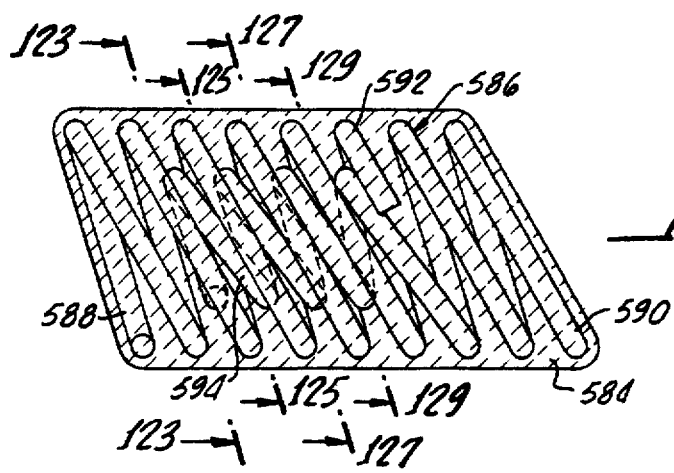
Figure 123:
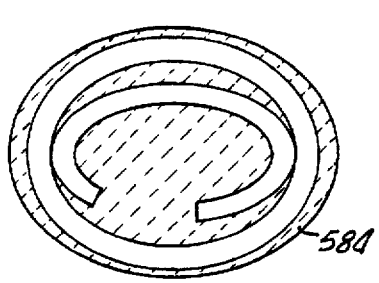
Figure 124:
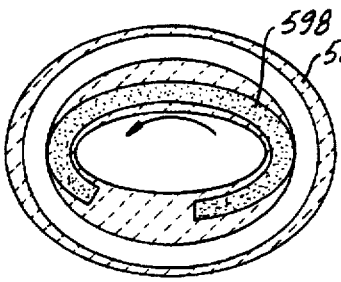
Figure 125:
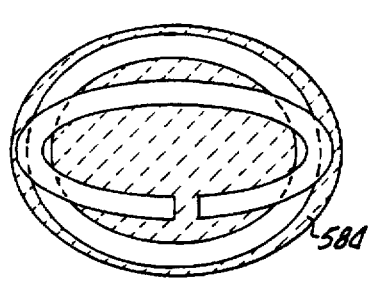
Figure 127:
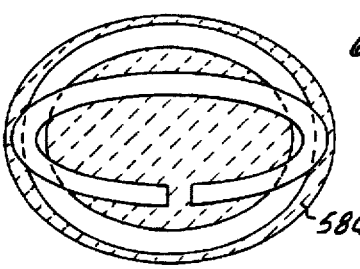
Figure 128:
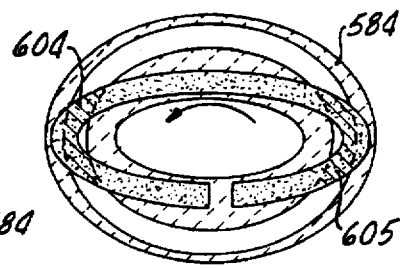
Figure 129:
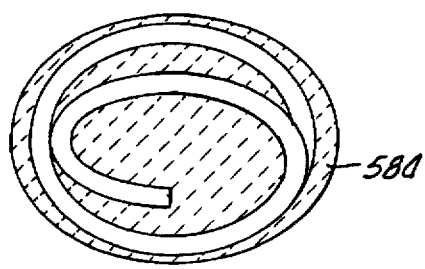
Figure 130:
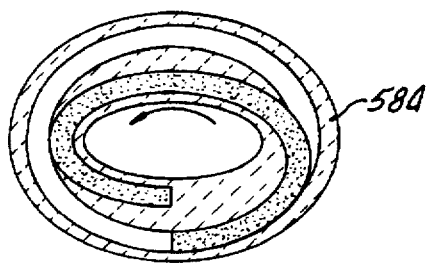

FIGS. 123 and 124 show cross-sections taken along the line A—A of FIG. 122 for a solid core elastomer 184 (see FIG. 123) and the elastomer 184 having a hollow center 598, as shown in FIG. 124. Similarly, FIGS. 125 and 126 correspond to view B—B taken from FIG. 122. FIGS. 127 and 128 show solid and hollow core elastomer 184 taken along the line C—C in FIG. 122. FIGS. 129 and 130 show solid and hollow core elastomers viewed along the line D—D of FIG. 122.

Figure 126:
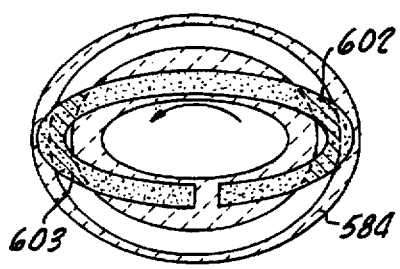

Also shown in FIGS. 126 and 128 are contacted area points 602–605, illustrating mechanical linkage between the end coils 592, 594, as hereinbefore described in greater detail.

While the present invention has been hereinabove described in terms of canted coils, it should be appreciated that the coils need not be canted. In that regard, FIGS. 131–135 illustrate an embodiment 610, in accordance with the present invention, in which intermediate coils 612, 614 are circular and not canted; and end coils 618, 620 are also circular and uncanted. FIGS. 131 and 132 show side and end views, respectively, of the intermediate coils 612 and end coils 618 whereas FIGS. 133 and 134 show side and end views, respectively, of the intermediate coils 614 and end coils 620.

FIG. 135 illustrates the assembly of the end coils 618, 620.

It should also be appreciated that in the embodiments hereinabove described that the end coils may be of the same or different configuration. That is, the elliptical end coil 324 may be used with a round end coil 332.

Although there has been hereinabove described a coil spring with ends adapted for coupling without welding, in accordance with the present invention, for the purpose of illustrating the manner in which the invention may be used to advantage, it should be appreciated that the invention is not limited thereto.

It should be further appreciated that the coupling of spring ends in accordance with the present invention is particularly suitable for springs providing bias while at the same time enabling efficient sealing, electromagnetic shielding and/or conductivity.

Accordingly, any and all modifications, variations, or equivalent arrangements which may occur to those skilled in the art, should be considered to be within the scope of the present invention as defined in the appended claims.

What is claimed is:

1. Spring apparatus comprising:
   a coiled spring having two ends and a plurality of intermediate coils, each coil having a leading portion disposed at a front angle to a normal line to one centerline and a trailing portion disposed at a back angle to said normal line;
   female end coils disposed within one end of the coiled spring and having a diameter smaller than the intermediate coils; and
   male end coils disposed at another end of the coiled spring and including latch means for insertably engaging the female end coils and causing the two ends of the coiled spring to be locked with even spacing between adjacent intermediate coils surrounding the locked ends of the coiled spring.

2. The spring according to claim 1 wherein said latch means comprises a single coil extending outwardly from said intermediate coils along a centerline thereof.

3. The spring according to claim 2 wherein said female end coils comprise abutting coils.

4. The spring according to claim 3 wherein said intermediate coils are canted along a centerline of the coiled spring.

5. The spring according to claim 3 wherein the latch means single coil protrudes through the female end coils upon locking of the two ends of the coiled spring.

6. The spring according to claim 5 wherein said female end coils comprise round coils.

7. The spring according to claim 5 wherein the intermediate coils and end coils are filled with an elastomer.

* * * * *